US007957052B2

(12) United States Patent
Kawase et al.

(10) Patent No.: US 7,957,052 B2
(45) Date of Patent: Jun. 7, 2011

(54) DISPLAY DEVICE, METHOD OF MANUFACTURING DISPLAY DEVICE AND ELECTRONIC APPARATUS

(75) Inventors: Takeo Kawase, Suwa (JP); Harunobu Komatsu, Matsumoto (JP); Hitoshi Yamamoto, Chino (JP); Akira Matsumoto, Chino (JP); Mitsuo Kushino, Kawabe-gun (JP); Tomoyuki Kuwamoto, Nara (JP); Teruki Matsushita, Suita (JP); Hironobu Hashimoto, Kawanishi (JP)

(73) Assignees: Seiko Epson Corporation, Tokyo (JP); Nippon Shokubai Co., Ltd., Osaka-shi (JP)

( * ) Notice: Subject to any disclaimer, the term of this patent is extended or adjusted under 35 U.S.C. 154(b) by 63 days.

(21) Appl. No.: 12/588,651

(22) Filed: Oct. 22, 2009

(65) Prior Publication Data

US 2010/0097685 A1 Apr. 22, 2010

(30) Foreign Application Priority Data

Oct. 22, 2008 (JP) ................................ 2008-272548

(51) Int. Cl.
*G02F 1/167* (2006.01)
*G02B 26/00* (2006.01)
*G09G 3/34* (2006.01)

(52) U.S. Cl. ....................................... 359/296; 345/107

(58) Field of Classification Search .................. 345/107; 359/296

See application file for complete search history.

(56) References Cited

U.S. PATENT DOCUMENTS 3,892,568 A 7/1975 Ota
7,764,420 B2 * 7/2010 Kawase et al. ................ 359/296
2009/0128889 A1 5/2009 Kawase et al.
2010/0259813 A1 * 10/2010 Kawase et al. ................ 359/296
2011/0032180 A1 * 2/2011 Kawase et al. ................ 345/107

FOREIGN PATENT DOCUMENTS

JP 50-15115 6/1975
JP B2-2551783 11/1996
JP A-2006-343782 12/2006
JP A-2009-128385 6/2009
JP A-2009-145873 7/2009

* cited by examiner

*Primary Examiner* — David N Spector

(74) *Attorney, Agent, or Firm* — Oliff & Berridge, PLC

(57) ABSTRACT

A display device comprises a microcapsule-containing layer including a plurality of microcapsules. A variation of the outer diameters of the microcapsules can be defined by an average value and a CV value. Each of the microcapsules is comprised of: a shell having an inner surface; contact particles electrically charged and provided within the shell in an contact state that the contact particles are in contact with the inner surface of the shell; and a scattering body for scattering light; or a colored particles having a different hue from the hue of the contact particles. The display device further comprises a pair of electrodes that when an electrical voltage is applied to between the pair of electrodes, electrical fields to act on the contact particles are generated. The average value of the outer diameters of the microcapsules is in the range of 20 to 60 μm, and the CV value of the outer diameters of the microcapsules is 20% or less. In a case where the electrical voltage is applied to between the pair of electrodes, the contact particles are moved along the inner surface of the shell while maintaining the contact state with the inner surface of the shell.

16 Claims, 22 Drawing Sheets

(Black Display)
1000 1000
1300 1100 1200 1300 1100
1200

(White Display)
1000 1000
1300 1100 1100 1200
1300 1200

DISPLAY DEVICE, METHOD OF MANUFACTURING DISPLAY DEVICE AND ELECTRONIC APPARATUS

CROSS-REFERENCE TO RELATED APPLICATION

This application claims a priority to Japanese Patent Application No. 2008-272548 filed on Oct. 22, 2008 which is hereby expressly incorporated by reference herein in its entirety.

BACKGROUND

1. Technical Field

The present invention relates to a display device, a method of manufacturing a display device and an electronic apparatus, and more specifically relates to a display device, a method of manufacturing the display device and an electronic apparatus provided with the display device.

2. Related Art

It is generally known that, if electrical fields are allowed to act on a dispersion system in which fine particles are dispersed in a liquid, the fine particles move (or migrate) in the liquid by a Coulomb force (an electrostatic force). This phenomenon is referred to as electrophoresis. In recent years, an electrophoretic display device that displays desired information (images) using the electrophoresis draws attention as a new display device.

This electrophoretic display device enjoys reduced power consumption, because it has a display memory property with which a display content is maintained even at the time of stoppage of voltage application. In particular, since the electrophoretic display device performs its display operations using reflected light just like general printed matters, it has such features as a broad viewing angle property and a high-contrast display capability.

As one example of conventional electrophoretic display devices, Japanese Patent No. 800963 discloses an electrophoretic display device that makes use of an electrophoretic dispersion liquid prepared by dispersing two kinds of electrophoretic particles charged with opposite polarities to each other in a liquid phase dispersion medium.

Further, Japanese Patent No. 2551783 discloses an electrophoretic display device that makes use of microcapsules, each of which includes an electrophoretic dispersion liquid prepared by dispersing one kind of electrophoretic particles in a liquid-phase dispersion medium, and a shell into which the electrophoretic dispersion liquid is encapsulated.

Furthermore, there has been proposed a combination of the two electrophoretic display devices disclosed in these patent documents, i.e., an electrophoretic display device that makes use of microcapsules, each of which includes an electrophoretic dispersion liquid prepared by dispersing electrophoretic particles for white color display (white particles) and electrophoretic particles for black color display (black particles) in a liquid-phase dispersion medium, the white particles and the black particles being charged with opposite polarities to each other, and a shell into which the electrophoretic dispersion liquid is encapsulated.

In the conventional electrophoretic display devices, an absolute value of a net charge amount of an inner wall of a retention wall (partitioning wall) or a capsule (the shell) is smaller than an absolute value of a net charge amount of a surface of each of the electrophoretic particles, and charge polarities thereof are opposite to each other.

As a result, if electrical fields act on the electrophoretic particles, they are moved parallel to an application direction of the electrical fields toward an electrode having a charge polarity opposite to the charge polarity of the surfaces of the electrophoretic particles.

With the conventional electrophoretic display devices, a difference in electrophoretic mobility or the like between the electrophoretic particles (the white and black particles) is used in obtaining a gray color of specified gradation which is an intermediate tone (intermediate color) of white color and black color.

A specified magnitude of the electrical voltage is applied to between a pair of electrodes for a predetermined time in such a fashion that a perfectly white state is not changed to a perfectly black state or a perfectly black state is not changed to a perfectly white state.

This creates a state that the white particles and the black particles are dispersed or aggregated in a specific region in the liquid-phase dispersion medium. Thus, the gray color is obtained at any rate.

In the conventional electrophoretic display devices, however, it is difficult to obtain a specific intermediate tone of a gray color or other colors of specified gradation.

More specifically, if the electrical voltage is applied to between a pair of electrodes in a perfectly white state or a perfectly black state, the white particles and the black particles are moved from one electrode to the other electrode in a liquid-phase dispersion medium while colliding with each other, respectively.

Further, when the gray color is displayed, the white particles and the black particles exist in a mixed state. This leads to inferior reproducibility and makes it very difficult to obtain a gray color of specified gradation.

Even if the gray color is obtained by stoppage of the application of the electrical voltage to between the pair of electrodes, such a state is unstable and is changed over time.

In other words, since the white particles and the black particles are floating in the liquid-phase dispersion medium, they are moved in the liquid-phase dispersion medium over time. Furthermore, since the white particles and the black particles are electrically charged with the opposite polarities to each other, they are adsorbed together so that a plurality of the white and black particles are aggregated together.

For these reasons, even if the gray color of the specified gradation is obtained, the gray color cannot be maintained as it is and thus a displayed image becomes highly unstable.

Moreover, the mutually adsorbed white and black particles need to be separated prior to providing the next display. To this end, an electrical voltage having higher magnitude is repeatedly applied to between the pair of electrodes while alternately changing its polarity. Otherwise, an additional electrode needs to be provided for that purpose.

This makes a control operation and a structure of the conventional electrophoretic display device complicated, and leads to increased power consumption thereof.

SUMMARY

As a result of keen examination, the present inventors have succeeded in finding out a method (an electro-crawling method) by which electrically charging contact particles (fine particles) are crawlingly moved along the inner surface of a capsule body (shell) of each of microcapsules, as distinguished from the conventional electrophoresis method. A description will be made on this electro-crawling method later.

However, in the display device operating with the electro-crawling method, the microcapsules are arranged between a pair of electrodes, and thus if some microcapsules (shells of some microcapsules) are partially flattened or deformed at both or either of a display surface side and/or a back surface side of the display device, there is a problem that display contrast is reduced. Such a problem could not be found in the conventional display apparatus operating with the electrophoresis method.

In other words, as shown in FIG. 22, an outer diameter of each of the microcapsules 1000 is not constant, that is, the microcapsules 1000 include large diameter microcapsules and small diameter microcapsules. In particular, the large diameter microcapsules 1000 are likely to be deformed, and therefore the shapes of the large diameter microcapsules 1000 become partially flattened.

Further, in the display device operating with the electro-crawling method, the contact particles are moved along an inner surface of a capsule body 1100 (FIG. 22) with being in contact with the inner surface thereof. In order to accomplish such movement of the contact particles, electric fields are needed to be generated in a tangential direction of the inner surface of the capsule body 1100, which are obtained by applying an electrical voltage to between the pair of electrodes.

Therefore, the shapes of the large diameter microcapsules 1000 become flattened at both or either of the display surface side and/or the back surface side of the display device. In other words, an upper inner surface and a lower inner surface of each of the large diameter microcapsules 1000 become flat as shown in FIG. 22. If the upper and lower inner surfaces of the capsule body 1100 of the large diameter microcapsule 1000 become parallel (flat) to an electrode 1200, it becomes difficult for the contact particles being contact with (adhering to) the upper and lower inner surfaces of the capsule body 1100 to move along the inner surface (side inner surface) of the capsule body 1100.

This makes it difficult for the display device to display a gray color as shown in FIG. 22. That is, if a white color is to be displayed after displaying a black color, black particles 1300 which are the contact particles being into contact with the upper inner surface remain as they are. This makes it difficult for the display device to display the gray color as a display color.

On the contrary, if the black color is to be displayed after displaying the white color, the black particles 1300 cannot be moved from the lower inner surface to the upper inner surface so that the display color becomes the gray color. As a result, display contrast is reduced.

It is therefore an object of the present invention to provide a display device capable of easily and reliably obtaining high display contrast and an intermediate tone and reliably maintaining individual colors including the intermediate tone even at stoppage of application of an electrical voltage. It is another object of the present invention to provide a method of manufacturing the display device capable of easily and reliably manufacturing the display device, and an electronic apparatus provided with the display device.

These objects are achieved by the present inventions described below.

In a first aspect of the present invention, there is provided a display device. The display device comprises a microcapsule-containing layer including a plurality of microcapsules each having an outer diameter, wherein a variation of the outer diameters of the plurality of microcapsules can be defined by an average value and a CV value.

Each of the plurality of microcapsules is comprised of: a shell having an inner surface; contact particles electrically charged and provided within the shell in an contact state that the contact particles are in contact with the inner surface of the shell, and the contact particles having a hue; and a scattering body for scattering light, and the scattering body provided within the shell; or a colored particles having a different hue from the hue of the contact particles, and the colored particles provided within the shell.

The display device further comprises a pair of electrodes that when an electrical voltage is applied to between the pair of electrodes, electrical fields to act on the contact particles are generated. The average value of the outer diameters of the plurality of microcapsules is in the range of 20 to 60 μm, and the CV value of the outer diameters of the microcapsules is 20% or less.

In a case where the electrical voltage is applied to between the pair of electrodes, the contact particles are moved along the inner surface of the shell while maintaining the contact state with the inner surface of the shell.

This ensures that the contact particles (display particles) are always in contact with any region on the inner surface of the shell of each of the microcapsule (are biased in a direction of approaching the inner surface thereof). As a result, the contact particles are reliably moved along the inner surface thereof while maintaining the contact state. Therefore, it is possible to easily and reliably obtain an intermediate tone.

In addition, since the contact particles are biased to the inner surface of the shell even at stoppage of the application of the electrical voltage to between the pair of electrodes, it is possible to reliably maintain individual colors including the intermediate tone. In other words, display is highly stable and, even when the application of the electrical voltage is stopped after a specified display content (an image) has been displayed, the display content is maintained stably (namely, it is possible to prevent deterioration of a display state).

Further, the contact particles are in contact with the inner surface of the shell so that they are hard to adhere to the scattering body or the colored particles. This assists in increasing display contrast and chromatic purity. Furthermore, it is possible to reliably move the contact particles with relatively weak electrical fields, thereby reducing power consumption of the display device.

Furthermore, since the CV value (coefficient of variation) of the outer diameters (particle diameter) of the microcapsules is small, shapes of the microcapsules do not become flattened, that is, they keep a spherical shape. This makes it possible for the contact particles to reliably move along the inner surface of the shell while maintaining the contact state when the contact particles are moved. As a result, it is possible to reliably display individual colors including the intermediate tone, thereby obtaining high display contrast.

Furthermore, since the average value of the outer diameters of the microcapsules falls within the above noted range, the shell is hardly compressed. In addition to that, it is possible to provide the contact particles and the scattering body or the colored particles of a relative large amount within the shell. This makes it possible for the white particles to improve property of concealing the black particles when the white color is displayed. As a result, the white color is displayed clearly, thereby obtaining high display contrast.

Furthermore, it is possible to easily and reliably manufacture a display device compared with what is called a microcup-type display device.

In the display device according to the present invention, it is preferred that the contact particles are in contact with the inner surface of the shell due to an electrostatic force exerted therebetween.

This makes it possible to contact the contact particles to the inner surface of the shell easily and reliably.

In the display device according to the present invention, it is also preferred that the contact particles have a polarity, the microcapsules have net charges having the same polarity as the polarity of the contact particles, and the net charges are existed within the shell, so that the contact particles are in contact with the inner surface of the shell due to the same polarity of the net charges.

This also makes it possible to contact the contact particles to the inner surface of the shell easily and reliably.

In the display device according to the present invention, it is also preferred that a force of holding the contact particles against the inner surface of the shell is greater than an electrostatic force of acting on the contact particles due to the electrical fields generated between the pair of electrodes.

With the display device, the contact particles can be moved along the inner surface of the shell with maintaining the contact state more reliably.

In the display device according to the present invention, it is also preferred that the scattering body or the colored particles comprise a liquid filled in the shell.

This makes it possible to obtain more excellent display performance of the display device.

In the display device according to the present invention, it is also preferred that the liquid is constituted of a liquid-phase dispersion medium and dispersion particles dispersed in the liquid-phase dispersion medium.

This also makes it possible to obtain more excellent display performance of the display device.

In the display device according to the present invention, it is also preferred that the dispersion particles comprise particles of scattering light or colored particles.

This also makes it possible to obtain more excellent display performance of the display device.

In the display device according to the present invention, it is also preferred that the contact particles have a polarity, and the dispersion particles are not substantially electrically charged, or the dispersion particles are electrically charged in an opposite polarity as the polarity of the contact particles.

This makes it possible to prevent the dispersion particles from being contact with the inner surface of the shell by being biased in a direction of approaching the inner surface of the shell.

In the display device according to the present invention, it is also preferred that the scattering body or the colored particles is/are a structural body provided within the shell so as to be spaced apart from the inner surface of the shell to a predetermined distance, and the structural body having an outer surface. The contact particles are positioned between the inner surface of the shell and the outer surface of the structural body.

This also makes it possible to obtain more excellent display performance of the display device.

In the display device according to the present invention, it is also preferred that the contact particles are colored particles.

This also makes it possible to obtain more excellent display performance of the display device.

In the display device according to the present invention, it is also preferred that the pair of electrodes are provided opposite to each other through the microcapsule-containing layer, and a shape of each shell is a spherical shell shape.

This makes it possible for the contact particles to smoothly and reliably move along the inner surface of the shell having the spherical shell shape. Therefore, it is possible to obtain individual colors including the intermediate tone more easily and reliably.

In the display device according to the present invention, it is also preferred that the display device has a side surface, and an average roundness R of the microcapsules represented by the following formula (I) is in the range 0.88 to 1 when viewed from the side surface of the display device.

$$R=L_0/L_1 \quad (I)$$

$L_1$ (μm) represents a circumference of a projected image of the microcapsule that is a subject of measurement, and $L_0$ (μm) represents a circumference of a perfect circle having the same area as that of the projected image of the microcapsule that is the subject of measurement.

This makes it possible for the contact particles to smoothly and reliably move along the inner surface of the shell. Therefore, it is possible to obtain individual colors including the intermediate tone more easily and reliably.

In the display device according to the present invention, it is also preferred that the shell comprises a first layer and a second layer arranged outside the first layer, and each of the first layer and the second layer has a shell-like shape.

This makes it possible to manufacture the display device easily.

In the display device according to the present invention, it is also preferred that the display surface has a display surface, positions of the contact particles included in the microcapsules are adjusted by adjusting of a magnitude of the electrical voltage to be applied to between the pair of electrodes and/or a time of applying the electrical voltage to between the pair of electrodes, so that when the display device is viewed from the display surface, a ratio of an area of a region in which the contact particles provided within the shell are viewed and an area of a region in which the scattering body or the colored particles provided within the shell is/are viewed is adjustable.

This makes it possible to obtain an intermediate tone more easily and reliably.

In a second aspect of the present invention, there is provided a method of manufacturing a display device. The method comprises a microcapsule-containing layer formation step for forming a microcapsule-containing layer including a plurality of microcapsules each having an outer diameter and a shell having an inner portion with an inner surface.

Each of the microcapsules is produced by encapsulating a plurality of electrically charged contact particles having a hue and a polarity, and a scattering body for scattering light or a colored particles for having a different hue from the hue of the contact particles. A CV value of the outer diameters of the microcapsules is 20% or less.

The method further comprises an electrode formation step for forming a pair of electrodes that when an electrical voltage is applied to between the pair of electrodes, electrical fields to act on the contact particles are generated.

The microcapsule-containing layer formation step comprises a charging step for providing net charges, of which polarity is the same as the polarity of the contact particles, to the inside of the shell after forming the inner portion or the entirety of the shell, so that the contact particles are in contact with the inner surface of the shell.

This makes it possible to manufacture the display device according to the present invention easily and reliably.

In the method of manufacturing the display device according to the present invention, it is preferred that the shell comprises a first layer corresponding to the inner portion and a second layer arranged outside the first layer, and each of the first layer and the second layer has a shell-like shape, and the charging step is performed when forming the second layer.

This also makes it possible to manufacture the display device according to the present invention more easily and reliably.

In the method of manufacturing the display device according to the present invention, it is also preferred that each of the microcapsules has an outer surface opposite to the side of the inner portion with the inner surface.

In the microcapsule-containing layer formation step, the microcapsule-containing layer is formed using a microcapsule coating material prepared by mixing the microcapsules with a fixing material that makes close contact with the outer surface of each of the microcapsules to fix the microcapsules in place, and the charging step is performed after the microcapsule-containing layer formation step.

This also makes it possible to manufacture the display device according to the present invention more easily and reliably.

In a third aspect of the present invention, there is provided an electronic apparatus provided with the above display device.

This makes it possible to provide an electronic apparatus with excellent display performance.

DESCRIPTION OF EXEMPLARY EMBODIMENTS

Hereinafter, a display device, a method of manufacturing a display device and an electronic apparatus in accordance with the present invention will be described in detail with reference to preferred embodiments shown in the accompanying drawings.

First Embodiment

1. Display Device

First, a description will be made on a display device according to the present invention.

Figure 1:
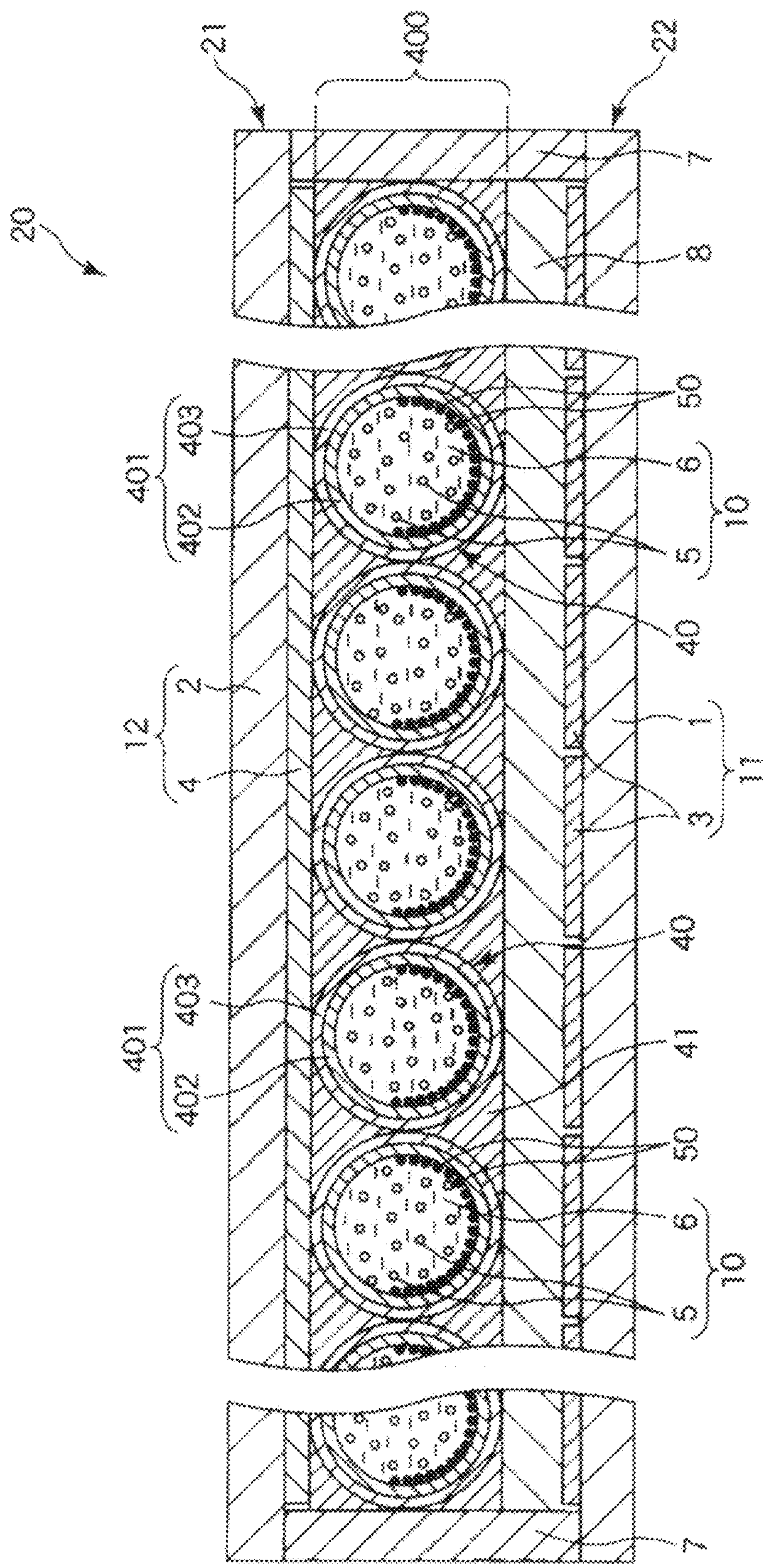
FIG. 1 is a vertical section view (section-side view) schematically showing a first embodiment of a display device according to the present invention.
Figure 2:
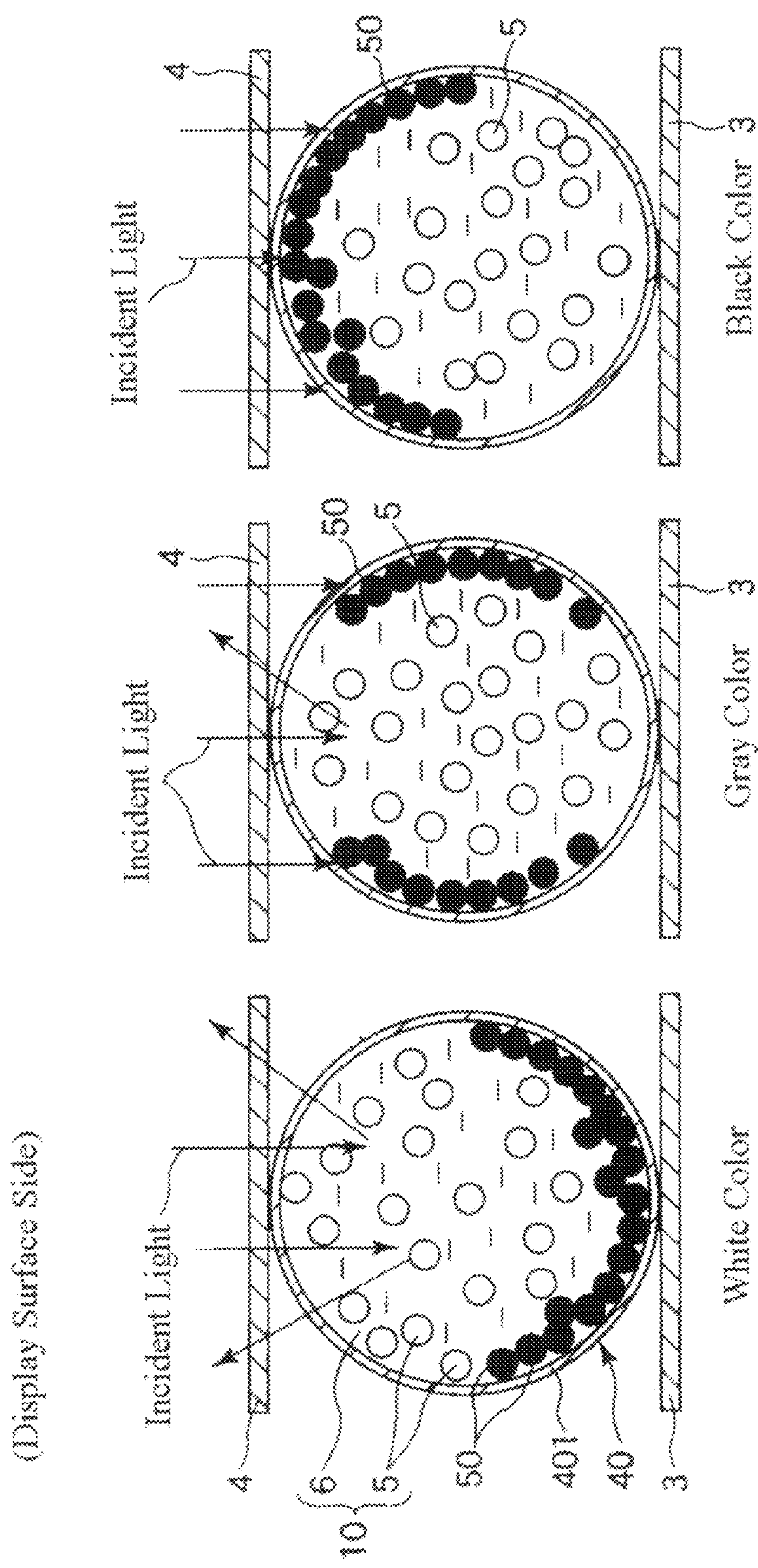
FIG. 2 is a pattern diagram for explaining behavior of the display device shown in FIG. 1.
Figure 3:
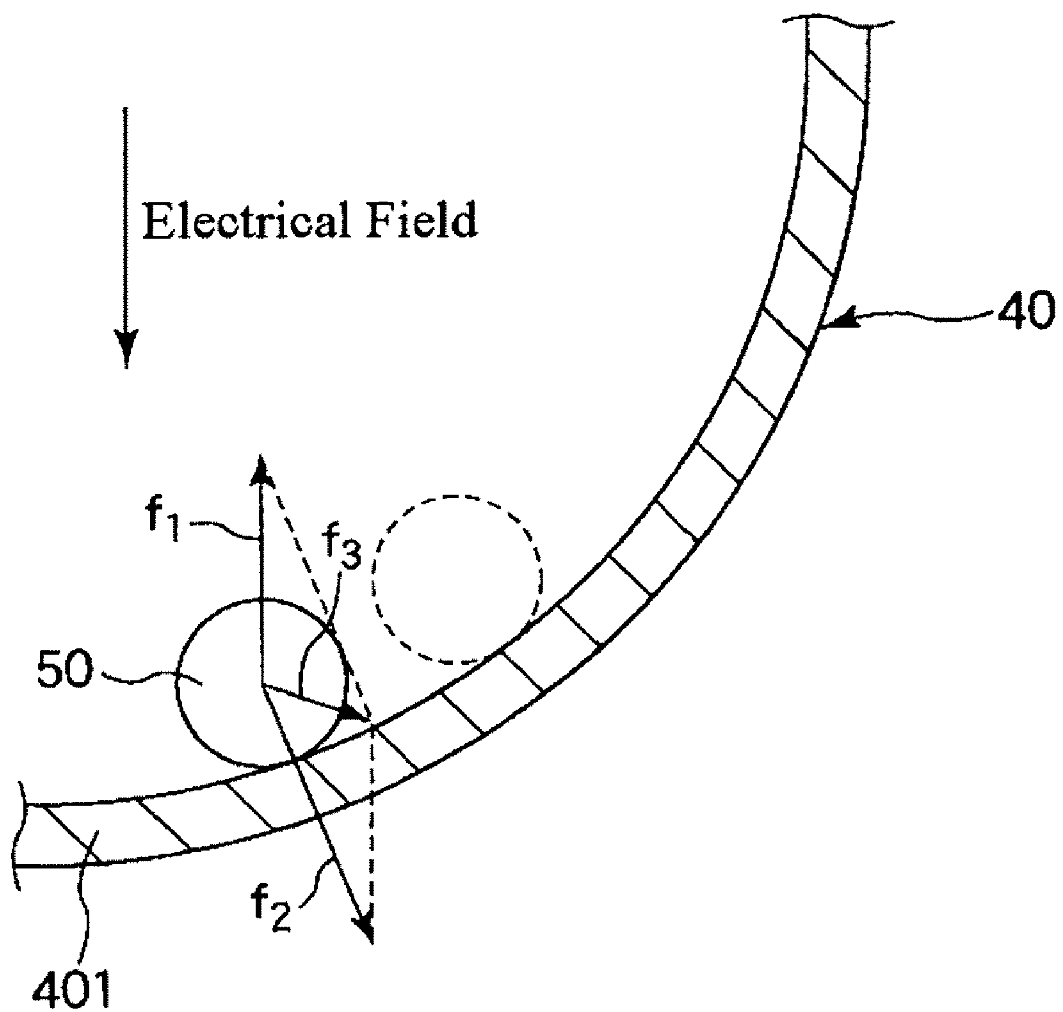
FIG. 3 is a pattern diagram for explaining behavior of the display device shown in FIG. 1.

FIG. 1 is a vertical section view (section-side view) schematically showing a first embodiment of a display device according to the present invention. FIGS. 2 and 3 are pattern diagrams for explaining behavior of the display device shown in FIG. 1.

Figure 4:
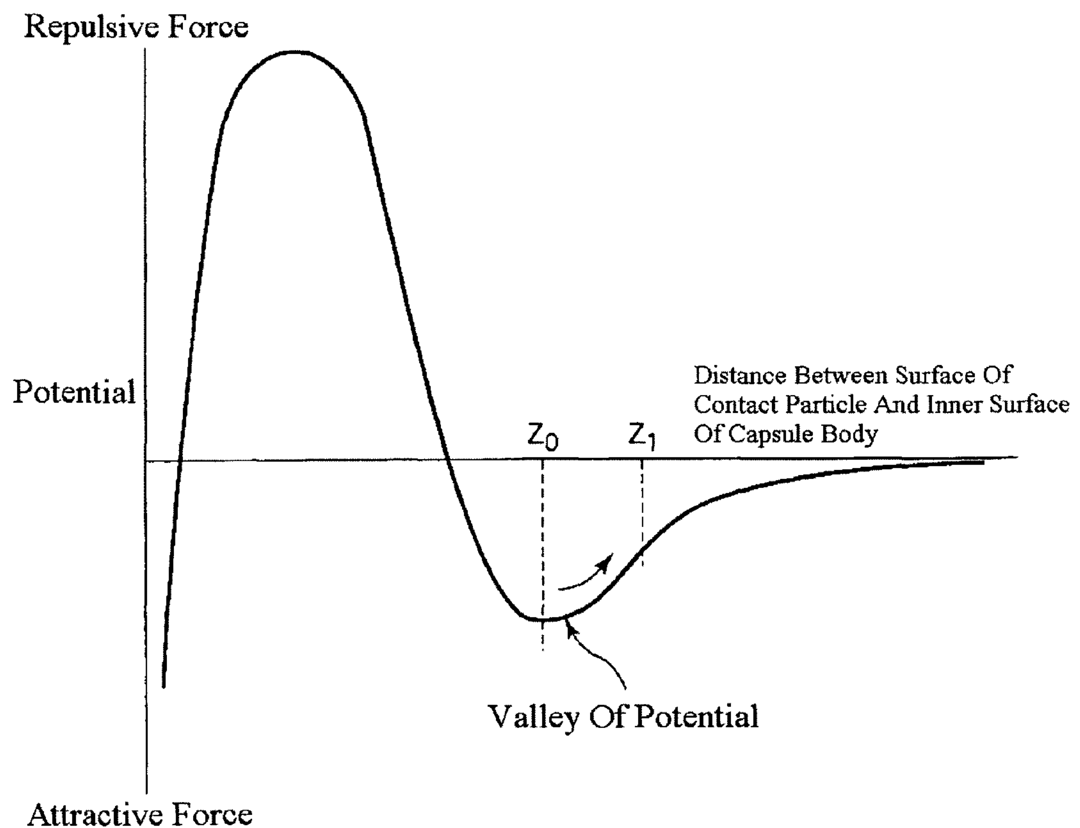
FIG. 4 is a graph (a potential curve) showing a relationship of a distance between a surface of each of contact particles and an inner surface of a capsule body to potential of the contact particle in the display device shown in FIG. 1.

FIG. 4 is a graph (a potential curve) showing a relationship of a distance between a surface of each of contact particles and an inner surface of a capsule body to potential of the contact particle in the display device shown in FIG. 1.

Figure 5:
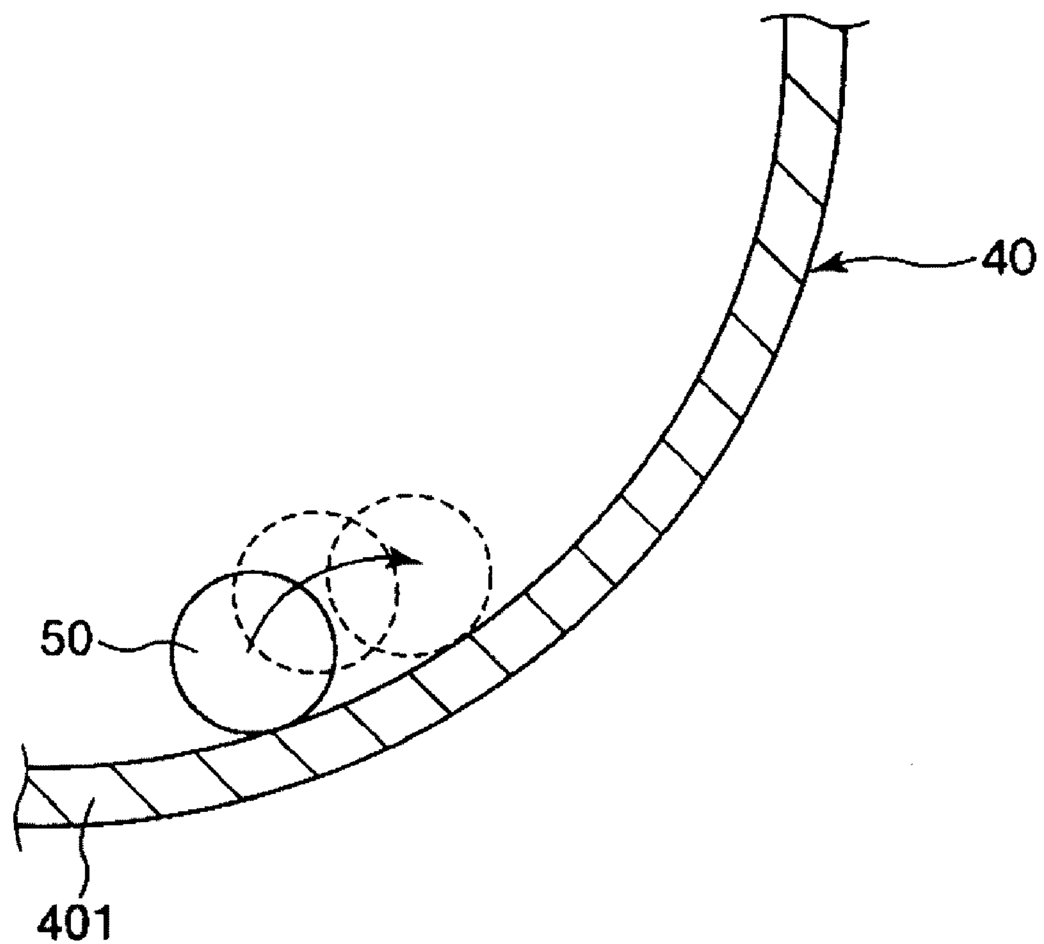
FIG. 5 is a pattern diagram for explaining behavior of the display device shown in FIG. 1.

FIG. 5 is a pattern diagram for explaining behavior of the display device shown in FIG. 1. Further, FIGS. 6A to 6C are also pattern diagrams for explaining behavior of the display device shown in FIG. 1. FIG. 6A is a vertical section view showing the display device. FIG. 6B is a side view showing the display device. FIG. 6C is a planner view when the display device is viewed from a display surface thereof.

FIGS. 7A to 7D and FIGS. 8E to 8G are pattern diagrams for explaining a method of manufacturing the display device shown in FIG. 1. FIGS. 9A to 9E are pattern diagrams (section views) for explaining a principle of the display device shown in FIG. 1.

Figure 10:
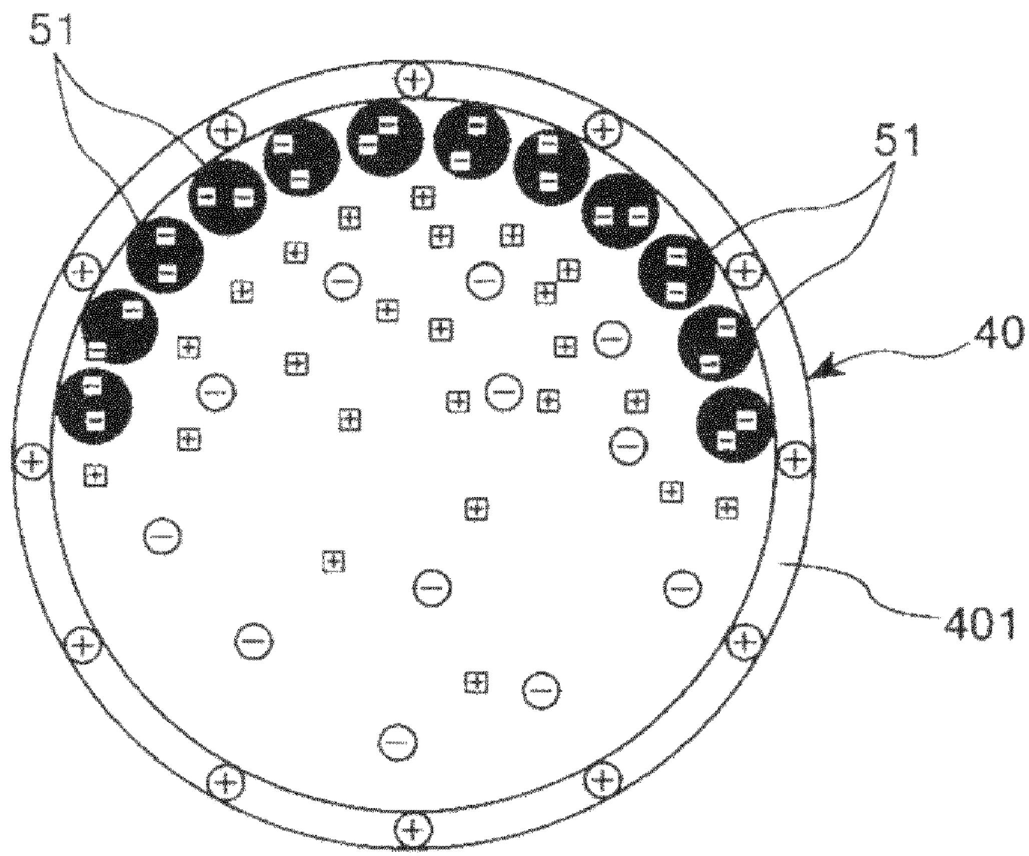
FIG. 10 is a pattern diagram (section view) showing a first configuration example of a microcapsule provided in the display device shown in FIG. 1.
Figure 11:
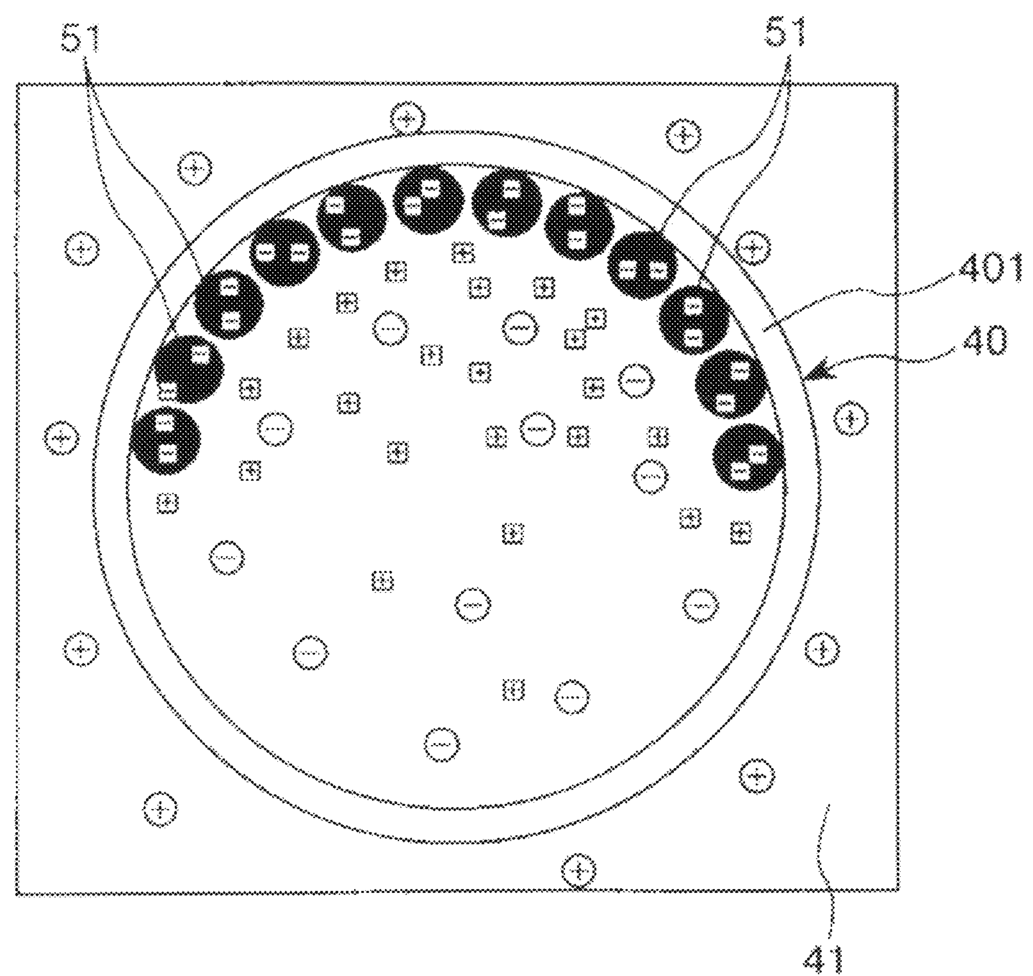
FIG. 11 is a pattern diagram (section view) showing a second configuration example of a microcapsule and a near-field region thereof (binder) provided in the display device shown in FIG. 1.
Figure 12:
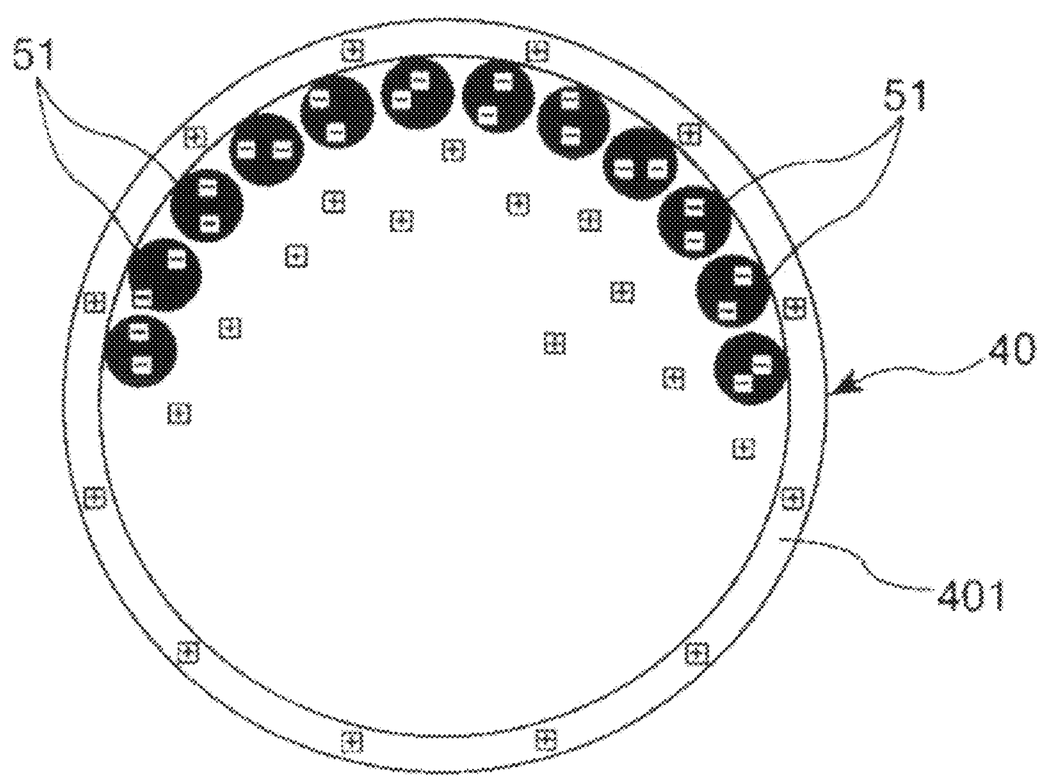
FIG. 12 is a pattern diagram (section view) showing a third configuration example of a microcapsule provided in the display device shown in FIG. 1.

FIG. 10 is a pattern diagram (section view) showing a first configuration example of a microcapsule provided in the display device shown in FIG. 1. FIG. 12 is a pattern diagram (section view) showing a third configuration example of a microcapsule provided in the display device shown in FIG. 1. FIG. 11 is a pattern diagram (section view) showing a second configuration example of a microcapsule and a near-field region thereof (binder) provided in the display device shown in FIG. 1.

Figure 13:
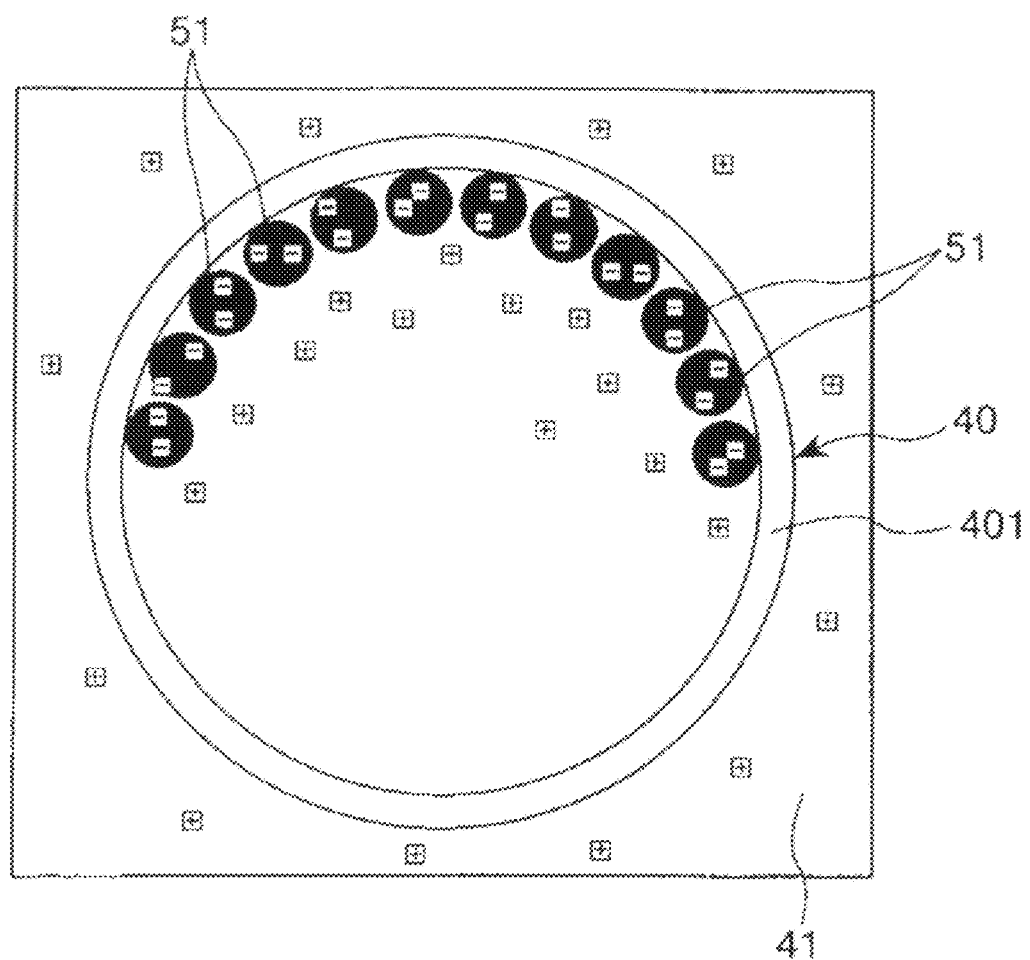
FIG. 13 is a pattern diagram (section view) showing a fourth configuration example of a microcapsule and a near-field region thereof (binder) provided in the display device shown in FIG. 1.
Figure 14:
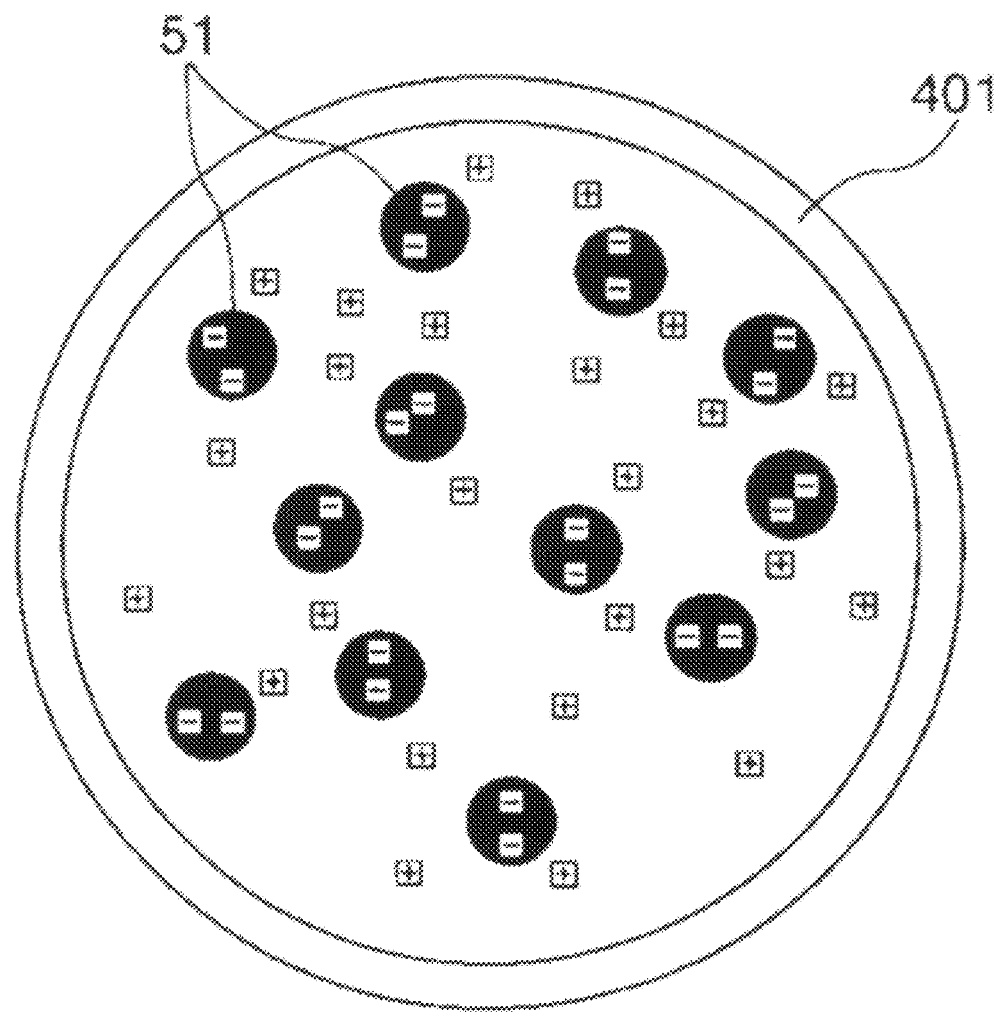
FIG. 14 is a pattern diagram (section view) showing a configuration example of a microcapsule provided in a conventional display device.

FIG. 13 is a pattern diagram (section view) showing a fourth configuration example of a microcapsule and a near-field region thereof (binder) provided in the display device shown in FIG. 1. FIG. 14 is a pattern diagram (section view) showing a configuration example of a microcapsule provided in a conventional display device.

Hereinafter, the upper side in each of FIGS. 1 to 3, 5, 7A to 7D, and 8E to 8G will be referred to as "upper" and the lower side will be referred to as "lower" for the purpose of convenience in the description. Further, in each of FIGS. 2, 3, 5, 6A to 6C, 9A to 9E, and 10 to 13, a construction of a capsule body 401 is simplified so that the construction thereof is shown as a single layer construction.

Furthermore, in each of FIGS. 6A to 6C, 9A to 9E, and 10 to 13, reference numerals of a liquid-phase dispersion medium 6 and dispersion particles 5 and diagonal lines representing sections thereof are omitted.

Furthermore, in each of FIGS. 6B and 6C, the capsule bodies 401 are section views to show insides thereof.

As shown in FIG. 1, the display device 20 includes a display sheet (a front plane) 21, a circuit board (a back plane) 22, an adhesive agent layer 8 for bonding the display sheet 21 and the circuit board 22 together, and a sealing part 7 for air-tightly sealing a gap between the display sheet 21 and the circuit board 22.

The display sheet 21 includes a base substrate 12, which has a plate-like base portion 2 and a second electrode 4 formed on a lower surface of the base portion 2, and a microcapsule-containing layer 400 arranged on a lower surface (one major surface) of the base substrate 12 (the second electrode 4) and comprised of a plurality of microcapsules 40 and a binder 41.

On the other hand, the circuit board 22 includes an opposite substrate 11, which has a plate-like base portion 1, and a plurality of first electrodes 3 formed on an upper surface of the base portion 1, and circuits (not shown) provided in the opposite substrate 11 (on the base portion 1), the circuits including switching elements such as TFTs and the like.

A construction of the respective parts will be now described one after another.

The base portions 1 and 2 are formed from a sheet-like (plate-like) member and have a function of supporting or protecting the respective members arranged therebetween.

Although the base portions 1 and 2 may be either flexible or rigid, it is preferred that the base portions 1 and 2 have flexibility. Use of the base portions 1 and 2 having flexibility makes it possible to provide a flexible display device 20, namely, a display device 20 useful in constructing, e.g., an electronic paper.

In the case where the base portions (base material layers) 1 and 2 are flexible, examples of a constituent material of each of them include polyolefin such as polyethylene, modified polyolefin, polyamide, thermoplastic polyimide, polyether, polyether ether ketone, various kinds of thermoplastic elastomers such as a polyurethane-based elastomer and a chlorinated polyethylene-based elastomer, copolymers mainly constituted of the above materials, blends mainly constituted of the above materials, polymer alloys mainly constituted of the above materials, and the like. One or more of these materials may be used independently or in combination.

An average thickness of each of the base portions 1 and 2 is not particularly limited to a specific value, but may be arbitrarily set depending on the constituent material and use thereof.

In the case where the base portions 1 and 2 are flexible, the average thickness of each of the base portions 1 and 2 is preferably in the range of about 20 to 500 μm, and more preferably in the range of about 25 to 250 μm. This makes it possible to reduce the size (especially, the thickness) of the display device 20, while harmonizing flexibility and strength of the display device 20.

The first electrodes 3 and the second electrode 4 (a pair of electrodes) are of a layered shape (a film shape) and are respectively arranged on both sides of the microcapsule-containing layer 400. In other words, the first electrodes 3 and the second electrode 4 are provided in a mutually facing relationship through the microcapsule-containing layer 400.

In this embodiment, the first electrodes 3 are formed on the upper surface of the base portion 1 and the second electrode 4 is formed on the lower surface of the base portion 2.

If an electrical voltage is applied to between the first electrodes 3 and the second electrode 4, electrical fields are generated across them so that the electrical fields act on contact particles (display particles) 50, which will be described below, present in the microcapsule-containing layer 400.

In this regard, it is to be noted that in the case where dispersion particles (display particles) 5 described later are electrically charged, the electrical fields also act on the dispersion particles 5.

In this embodiment, the second electrode 4 serves as a common electrode and the first electrodes 3 function as individual electrodes divided in a form of a matrix (pixel electrodes connected to the switching elements). A portion where the second electrode 4 is overlapped with one of the first electrodes 3 constitutes a unit pixel.

Just like the first electrodes 3, the second electrode 4 may also be divided into a plurality of electrodes. Furthermore, the first electrodes 3 may be divided into a plurality of stripe-shaped electrodes and, similarly, the second electrode 4 may also be divided into a plurality of stripe-shaped electrodes. In this case, the first electrodes 3 and the second electrode 4 may be arranged to intersect with each other.

A constituent material of each of the first electrodes 3 and the second electrode 4 is not particularly limited to a specific type as long as it is substantially conductive. Various kinds of conductive materials may be used as the constituent material of each of the first electrodes 3 and the second electrode 4.

Examples of such a conductive material include: a metallic material such as copper, aluminum or alloy containing these metals; a carbon-based material such as carbon black; an electronically conductive polymer material such as polyacetylene, polyfluorene or derivatives thereof; an ion-conductive polymer material produced by dispersing an ionic substance such as NaCl or $Cu(CF_3SO_3)_2$ in a matrix resin such as polyvinyl alcohol or polycarbonate; and a conductive oxide material such as indium oxide (IO); and the like. One or more of these materials may be used independently or in combination.

An average thickness of each of the first electrodes 3 and the second electrode 4 is not particularly limited to a specific value, but may be arbitrarily set depending on the constituent material and use thereof. The average thickness of each of the first electrodes 3 and the second electrode 4 is preferably in the range of about 0.05 to 10 μm, and more preferably in the range of about 0.05 to 5 μm.

Among the base portions 1 and 2 and the first electrodes 3 and the second electrode 4, the ones arranged on a display surface side (the base portion 2 and the second electrode 4 in this embodiment) are optically transparent, i.e., substantially transparent (clear and colorless, clear and colorful, or translucent).

This makes it possible to easily recognize, through visual observation, statuses of the contact particles 50 and the dispersion particles 5 described below, i.e., information (images) displayed by the display device 20.

In the display sheet 21, the microcapsule-containing layer 400 is provided in contact with a lower surface of the second electrode 4. The microcapsule-containing layer 400 includes a plurality of microcapsules and a binder (a fixing material) 41 for fixing (or holding) the microcapsules 40 in place, each of the microcapsules 40 having a capsule body (shell) 401, and a dispersion liquid 10 described below and the contact particles 50 encapsulated into the capsule body 401.

Hereinafter, the microcapsule-containing layer 400 will be described, but the microcapsules 40 will be described below in detail.

The binder 41 makes close contact with an outer surface of each of the microcapsules 40 and covers each of the microcapsules 40. Gaps (interstices) formed among the microcapsules 40 are filled with the binder 41.

The binder 41 is provided between the opposite substrate 11 and the base substrate 12 for the purpose of, e.g., bonding the opposite substrate 11 and the base substrate 12 together, fixing the microcapsules 40 between the opposite substrate 11 and the base substrate 12, assuring insulation between the first electrodes 3 and the second electrode 4, and generating strong electrical fields by filling the gaps among the microcapsules 40 therewith. This makes it possible to further improve durability, reliability and display performance of the display device 20.

Preferably used as the binder 41 is a resin material that exhibits high affinity with (improved adhesion to) the respective electrodes 3 and 4 and the capsule bodies 401 (of the microcapsules 40) and has increased insulation performance and relatively high permittivity which does not allow a current to flow at all or allows a current to slightly flow.

Examples of such a resin material used as the binder 41 include: a thermoplastic resin such as polyethylene, polypropylene, an ABS resin, a methacrylate resin (e.g., a methyl methacrylate resin), a vinyl chloride resin or a cellulose-based resin; a silicone-based resin; an urethane-based resin; and the like. One or more of these materials may be used independently or in combination.

In this embodiment, the display sheet 21 and the circuit board 22 are bonded together by means of the adhesive agent layer 8. This makes it possible to fix the display sheet 21 and the circuit board 22 in a reliable manner. It is preferred that the adhesive agent layer 8 is mainly constituted of polyurethane.

The polyurethane contains an isocyanate component and a polyol component. The isocyanate component may be, e.g., at least one kind of tetramethylxylene diisocyanate (TMXDI), hexamethylene diisocyanate (HMDI) and derivatives thereof. The polyol component may be, e.g., at least one kind of polypropylene glycol (PPG), polytetramethylene glycol (PTMG) and derivatives thereof.

A constituent material of the adhesive agent layer 8 is not limited to the polyurethane. In addition to the polyurethane, examples of the constituent material of the adhesive agent layer 8 further include a resin material such as polyethylene, chlorinated polyethylene, ABS resin, vinyl acrylate copolymer, a fluorine-based resin or a silicone-based resin, and the like. One or more of these materials may be used independently or in combination.

The sealing part 7 is provided between the base portions 1 and 2, and along peripheral edges of the first electrodes 3, the second electrode 4, the microcapsule-containing layer 400, and the adhesive agent layer 8. The first electrodes 3, the second electrode 4, the microcapsule-containing layer 400, and the adhesive agent layer 8 are air-tightly sealed by means of the sealing part 7.

This makes it possible to prevent moisture from infiltrating into the display device 20, thereby reliably avoiding degradation in display performance of the display device 20.

Various kinds of resin materials can be used as a constituent material of the sealing part 7. Examples of such resin materials include: a thermoplastic resin such as an acryl-based resin, an urethane-based resin or an olefin-based resin; a thermosetting resin such as an epoxy-based resin, a melamine-based resin or a phenol-based resin; and the like. One or more of these resin materials may be used independently or in combination.

In this regard, it is to be noted that the sealing part 7 may be either provided or removed depending on the circumstances.

The contact particles (electrically charged particles) 50 are in contact with (adhere to) the inner surface of the capsule body 401 of each of the microcapsules 40 by being biased in a direction of approaching the inner surface thereof. That is, the contact particles 50 are held in a state of being capable of moving along the inner surface of the capsule body 401.

In other words, the contact particles 50 are electrically charged with a specified polarity. Further, net charges exist inside the capsule body 401 (not include the capsule body 401 in itself) as will be set forth later. The net charges, which are a total value (summation) of total charges including charges of the contact particles 50, are not zero.

A polarity of the net charges is the same (same polarity) as that of the charges of the contact particles 50. Therefore, the contact particles 50 are in contact with (are biased) the inner surface of the capsule body 401 due to repulsive force (repelling force) occurring by electrostatic force between the charges of contact particles 50 and the charges of the net charges of which polarity is the same polarity as that of the contact particles 50.

Thus, the contact particles 50 adhere to the inner surface of the capsule body 401 in a movable state. In this regard, it is to be noted that the contact particles 50 look like adsorbing to the inner surface of the capsule body 401 in appearance.

Hereinafter, each force acting on the contact particles 50 inside the capsule body 401 is a force based on the inner surface of the capsule body 401 as long as each force is not particularly referred to a specific force. The force acting in the direction of approaching the inner surface of the capsule body 401 (a direction of proceeding to outside of the capsule body 401) is referred to as "attractive force". The force acting in a direction apart from the inner surface of the capsule body 401 (a direction of proceeding to a center portion of the capsule body 401) is referred to as "repulsive force".

The contact particles 50 may include one or more kinds of particles. It is preferred that colored particles are used as the contact particles 50. In this embodiment, black particles (colored particles) for displaying a black color are used as the contact particles 50.

In this embodiment, a liquid, namely a dispersion liquid 10 is encapsulated (or filled) inside the capsule body 401 as a scattering body for scattering light or colored particles having a different hue (color phase) from that of the contact particles 50.

The dispersion liquid 10 is constituted of a liquid-phase dispersion medium 6 and dispersion particles 5 dispersed (suspended) in the liquid-phase dispersion medium 6. The dispersion particles 5 may include one or more kinds of particles. It is preferred that particles for scattering light or colored particles having a different hue from that of the contact particles 50 are used as the dispersion particles 5.

In this embodiment, the particles for scattering the light (namely, white particles to display a white color) are used as the dispersion particles 5. In other words, in this embodiment, the dispersion particles 5 to scatter the light are dispersed in the liquid-phase dispersion medium 6, which are used as the dispersion liquid 10 (scattering body or colored particles). In this regard, it is to be noted that the white color is displayed by scattering the light.

A liquid for scattering light or a liquid containing no particles and having a different hue from that of the contact particles 50 may be used instead of the dispersion liquid 10. Further, gas for scattering the light or gas having the different hue from that of the contact particles 50 may be used instead of the dispersion liquid 10.

The dispersion particles 5 may be electrically charged or not electrically charged. In a case where the dispersion particles 5 are electrically charged, the dispersion particles 5 are needed to be electrically charged to the opposite polarity as that of the contact particles 50, namely the same polarity as that of the capsule body 401.

This makes it possible to prevent the contact particles 50 from being in contact with (adhering to) the inner surface of the capsule body 401 by being biased in the direction of approaching the inner surface thereof.

On the other hand, in a case where the dispersion particles 5 are not substantially electrically charged, it is possible to prevent the dispersion particles 5 and the contact particles 50 from being adsorbed to each other.

Further, in a case where the dispersion particles 5 are electrically charged to the opposite polarity to that of the contact particles 50, the polarity of the charges of contact particles 50 becomes the opposite as that of the net charges inside the capsule body 401. For this reason, a phenomenon that the dispersion particles 5 are pushed (adsorbed) to the inner surface of the capsule body 40 does not occur. Therefore, a dispersion state of the dispersion particles 5 is maintained in the liquid-phase dispersion medium 6.

In this regard, in this embodiment, it is to be noted that the dispersion particles 5 are not substantially electrically charged, and are uniformly dispersed in the liquid-phase dispersion medium 6.

A task of dispersing the dispersion particles 5 and the contact particles 50 in the liquid-phase dispersion medium 6 in producing the microcapsules 40 can be performed by using one or more of, e.g., a paint shaker method, a ball mill method, a media mill method, an ultrasonic dispersion method and a stirrer dispersion method.

A liquid that exhibits low solubility to the capsule body 401 and has relatively high insulation performance is preferably used as the liquid-phase dispersion medium 6.

Examples of the liquid-phase dispersion medium 6 include: waters such as distilled water and deionized water; alcohols such as methanol; cellosolves such as methyl cellosolve; esters such as methyl acetate; ketones such as acetone; aliphatic hydrocarbons (liquid paraffins) such as pentane; alicyclic hydrocarbons such as cyclohexane; aromatic hydrocarbons such as benzene; halogenated hydrocarbons such as methylene chloride; aromatic heterocycles such as pyridine; nitriles such as acetonitrile; amides such as N,N-dimethylformamide; carboxylic salts; oils such as silicone oil; and the like. One or more of them may be used independently or in combination.

Among them, it is preferable to use hydrocarbons each having a boiling point of 80° C. or higher or the silicone oil as the liquid-phase dispersion medium 6.

Further, if necessary, various kinds of additives may be added to the liquid-phase dispersion medium 6 (dispersion liquid 10). Examples of such additives include: a charge-controlling agent formed of particles of an electrolyte, a (anionic or cationic) surfactant such as alkenylsuccinate, a metal soap, a resin material, a rubber material, an oil, a varnish or a compound; a dispersion agent such as a silane-based coupling agent; a lubricating agent; a stabilizing agent; and the like.

Further, in a case where the liquid-phase dispersion medium 6 is colored, if necessary, a dye may be dissolved therein. Examples of the dye include an anthraquinone-based dye, an azo-based dye, an indigoid-based dye, and the like.

The contact particles 50 are charged particles capable of, under the action of the electrical fields, moving along the inner surface of the capsule body 401 in the liquid-phase dispersion medium 6. In other words, the contact particles 50 are moved along the inner surface of the capsule body 401 while maintaining the contact state as will be described later.

On the other hand, the dispersion particles 5 may be the charged particles capable of, under the action of the electrical fields, electrophoresing in the liquid-phase dispersion medium 6 as described above. Further, the dispersion particles 5 may not be the charged particles.

The contact particles 50 may be any kind of particles insofar as they have electrical charges. Further, the dispersion particles 5 may be any kind of particles insofar as they are particles for scattering the light or colored particles having the different hue from that of the contact particles 50, regardless of the charged particles (electrical charges).

Although not particularly limited, at least one of pigment particles, resin particles and composite particles thereof may be preferably used as the contact particles 50 and the dispersion particles 5. Use of these particles provides an advantage in that they are easy to produce, while assuring easier control of electrical charges.

Examples of a pigment of which the pigment particles are made include: a black pigment such as aniline black, carbon black or titanium black; a white pigment such as titanium oxide or antimony oxide; an azo-based pigment such as monoazo; a yellow pigment such as isoindolinone or chrome yellow; a red pigment such as quinacridone red or chrome vermilion; a blue pigment such as phthalocyanine blue or indanthrene blue; a green pigment such as phthalocyanine green; and the like. One or more of these pigments may be used independently or in combination.

Examples of a resin material of which the resin particles are made include an acryl-based resin, an urethane-based resin, an urea-based resin, an epoxy-based resin, polystyrene, polyester and the like. One or more of these resin materials may be used independently or in combination.

Examples of the composite particles include: particles produced by coating surfaces of the pigment particles with the resin material or other pigment; particles produced by coating surfaces of the resin particles with the pigment; and particles made of a mixture obtained by mixing the pigment and the resin material in a suitable composition ratio.

Examples of the particles produced by coating the surfaces of the pigment particles with the other pigment include particles obtained by coating surfaces of titanium oxide particles with silicon oxide or aluminum oxide. These particles are preferably used as the dispersion particles 5 for displaying a white color.

Carbon black particles, titanium black particles or particles produced by coating surfaces of these particles with other material are preferably used as the contact particles 50 for displaying a black color.

Further, shapes of the contact particles 50 and the dispersion particles 5 are not particularly limited to a specific type, but may preferably be a spherical shape.

It is preferred that contact particles 50 and the dispersion particles 5 each having a relatively small size are used. More specifically, an average particle size of each of the contact particles 50 and the dispersion particles 5 is preferably in the range of about 10 nm to 3 μm, more preferably in the range of about 20 nm to 2 μm, and even more preferably in the range of about 20 nm to 800 nm.

If the average particle size of each of the contact particles 50 and the dispersion particles 5 falls within the above-noted range, it is possible to prevent the contact particles 50 and the dispersion particles 5 from clumping together in the liquid-phase dispersion medium 6. Further, it is possible to reliably prevent the dispersion particles 5 from sinking in the liquid-phase dispersion medium 6.

Namely, the contact particles 50 and the dispersion particles 5 can be stably dispersed therein. As a result, it becomes possible to reliably prevent degradation in display quality of the display device 20.

In the case where two different particles of different colors are used as in this embodiment, there is no problem even that they have different average particle sizes. In the display device 20 according to the present invention, it is possible to improve display contrast of the display device 20.

As shown in FIG. 1, each of the microcapsules 40 has a size corresponding to a full thickness of the microcapsule-containing layer 400, and the microcapsules 40 are arranged lengthwise and crosswise between the opposite substrate 11 and the base substrate 12 so as to form a single layer (in which the microcapsules 40 are arranged side by side with no overlap in the thickness direction of the microcapsule-containing layer 400).

While one microcapsule 40 is aligned with one first electrode 3 in the illustrated construction, the present invention is not limited thereto. For example, two microcapsules 40 or more than two microcapsules 40 may be aligned with one first electrode 3.

In the illustrated construction, the microcapsules 40 are kept in a generally spherical shape without being compressed (pressed) in an up-and-down direction, even if they are sandwichedly held by the second electrode 4 and the adhesive agent layer 8 in between the opposite substrate 11 and the base substrate 12. The capsule body (the shell) 401 serving as a wall structure for defining a space filled with the dispersion liquid 10 (a space within which the scattering body or the colored particles is/are provided) is formed into a spherical shell shape.

In other words, the inner surface of the capsule body 401 is formed of a curved concave surface extending (continuously extending) between the first electrodes 3 and the second electrode 4. This means that no planar (flat) surface extending parallel to the first electrodes 3 and the second electrode 4 exists in the inner surface of the capsule body 401 (upper and lower inner surfaces). This makes it possible for the contact particles 50 to smoothly and reliably move along the inner surface (the curved concave surface) of the capsule body 401.

In this regard, it is to be noted that the microcapsules 40 are not limited to the spherical shape, but may be formed into, e.g., a generally elliptical shape or other shapes. In other words, the capsule body 401 is not limited to the spherical shape, but may be formed into, e.g., an elliptical shell shape or other shapes.

Further, the capsule body 401 and a near-field region thereof (that is, the binder 41) may be electrically charged or not be electrically charged. In this regard, it is to be noted that this will be described later.

In the display device 20, the net charges exist inside the capsule body 401 (not include the capsule body 401 in itself). The net charges, which are a total value (summation) of total charges including electrical charges of the contact particles 50, are not zero. The polarity of the net charges is the same (same polarity) as those of the electrical charges of the contact particles 50.

Therefore, the contact particles 50 are in contact with the inner surface of the capsule body 401 by attractive force acting between the contact particles 50 and the capsule body 401. The attractive force is a sum (total force) of the following three forces.

The first force is electrostatic force (attractive force) occurring due to the net charges (which include the electrical charges of the contact particles 50) existing inside the capsule body 401 (not include the capsule body 401 in itself).

The second force is van der Waals' force (attractive force) occurring between the contact particles 50 and the capsule body 401. The third force is repulsive force occurring due to osmotic pressure (which is generated by a steric stabilization treatment using a graft polymer).

Referring to FIG. 2, the contact particles 50 are in contact with (adhere to) the inner surface of the capsule body 401 and kept stationarily in a specified position when no electrical voltage is applied to between the first electrodes 3 and the second electrode 4. Further, the dispersion particles 5 are dispersed in the liquid-phase dispersion medium 6.

All the contact particles 50 may be in contact with the inner surface of the capsule body 401, but not limited thereto, a part thereof may not be in contact with the inner surface of the capsule body 401. For example, in a case where the contact particles 50 are arranged on the inner surface of the capsule body 401 in a state of two layers, the two layers of the contact particles 50 are arranged as follows.

One layer of the contact particles 50 is in contact with the inner surface of the capsule body 401. The other layer of the contact particles 50 is in contact with the one layer. This is also the same as a case during moving of the contact particles 50 described later.

If an electrical voltage is applied to between the first electrodes 3 and the second electrode 4 to generate electrical fields therebetween, the contact particles 50 are moved toward one of the electrodes 3 and 4 along the inner surface of the capsule body 401 under the action of the electrical fields while maintaining the contact state. Further, the dispersion particles 5 are maintained in a state of being dispersed in the liquid-phase dispersion medium 6.

Then, if the application of the electrical voltage is stopped, the contact particles 50 cease to move along the inner surface of the capsule body 401 and are stopped in a specified position while maintaining the contact state. Further, the dispersion particles 5 are maintained in the state of being dispersed in the liquid-phase dispersion medium 6.

More specifically, if the contact particles 50 are negatively charged and the net charges inside the capsule body 401 are negatively charged, and if an electrical voltage is applied to between the first electrodes 3 and the second electrode 4 so that the first electrodes 3 can be in a positive electrical potential with respect to the second electrode 4, the contact particles 50 are moved along the inner surface of the capsule body 401 toward the first electrodes 3 (toward the opposite side from the display surface of the display device 20) while maintaining the contact state.

In contrast, if an electrical voltage is applied to between the first electrodes 3 and the second electrode 4 so that the first electrodes 3 can be in a negative electrical potential with respect to the second electrode 4, the contact particles 50 are moved along the inner surface of the capsule body 401 toward the second electrode 4 (toward the display surface of the display device 20) while maintaining the contact state.

In this case, the position of the contact particles 50 can be adjusted by applying a pulsed voltage (a pulse voltage) to between the first electrodes 3 and the second electrode 4, namely by regulating one or both of magnitude (a voltage value) of the electrical voltage applied to between the first electrodes 3 and the second electrode 4 and a time (an application time) of applying the electrical voltage to between the first electrodes 3 and the second electrode 4.

Figure 6:
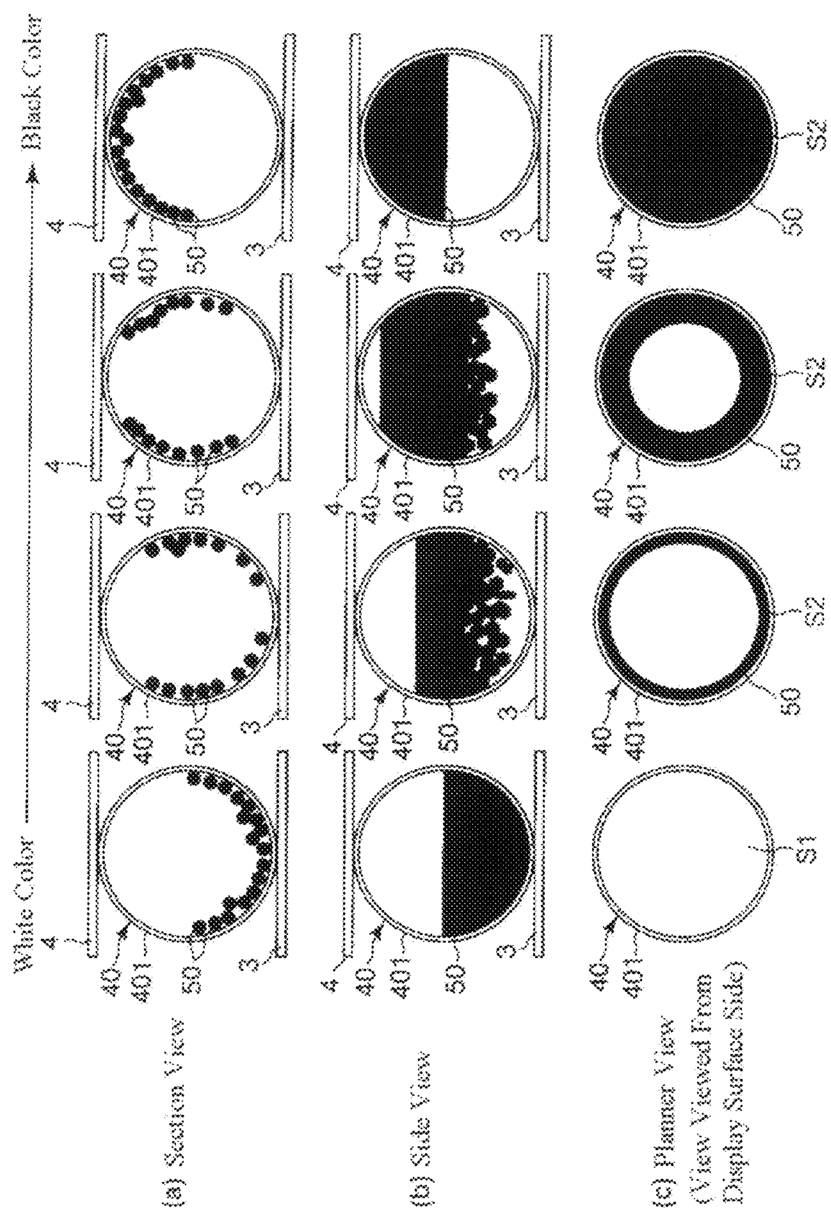
FIGS. 6A to 6C are pattern diagrams for explaining behavior of the display device shown in FIG. 1.

When the display device 20 is viewed from the display surface side (the upper side in FIG. 2), namely as shown in FIG. 6C, a ratio (S2/S1) of an area (S2) of a region in which the contact particles 50 are viewed, namely a black region in FIG. 6C, to a total area (S1) of region in which the dispersion particles 5 and the liquid-phase dispersion medium 6 within the capsule body 401 is viewed, namely a white region in FIG. 6C, can be adjusted (FIG. 6).

This makes it possible to change an amount (brightness) of light reflected at the microcapsules 40. In this regard, it is to be noted that each of the total area (S1) and the area (S2) is an area obtained by projecting to a flat surface with respect to the base portion 2 (base substrate 12).

This makes it possible, in providing the white and black display in this embodiment, to display an arbitrary intermediate tone (an intermediate color) between the white color and the black color, i.e., a gray color of arbitrary gradation (brightness). In other words, it is possible to continuously change the displayed color between the white color and the black color.

For example, when the contact particles 50 are positioned near the first electrodes 3 as shown on the left side in FIG. 2, namely when the contact particles 50 are positioned in a lower hemisphere of the capsule body 401 (a hemisphere near the first electrodes 3), namely the contact particles are invisible as viewed from the display surface side of the display device 20, the ratio (S2/S1) becomes 0, and therefore the displayed color becomes the white color.

In other words, almost all (most) of light incident on the microcapsules 40 is scattered by the dispersion particles 5. Therefore, the display device 20 is seen white when viewed from the display surface side thereof.

When the contact particles 50 are positioned near the second electrode 4, namely when the contact particles 50 are positioned in the upper hemisphere of the capsule body 401 (the hemisphere near the second electrode 4), namely only the contact particles are visible as viewed from the display surface side of the display device 20, the ratio (S2/S1) becomes 1, and therefore the displayed color becomes the black color.

In other words, almost all (most) of light incident on the microcapsules 40 is adsorbed by the contact particles 50. Therefore, the display device 20 is seen black (the same color as the contact particles 50) when viewed from the display surface side thereof.

When the contact particles 50 are medially positioned between the first electrodes 3 and the second electrode 4, namely when the contact particles 50 are distributed like a belt over upper and lower hemispheres of the capsule body 401, namely the contact particles 5 are viewed in a form of a ring as viewed from the display surface side of the display device 20 (FIG. 6C), the ratio (S2/S1) becomes a predetermined value which is larger than 0 and smaller than 1, and therefore the displayed color becomes a gray color of a predetermined gradation.

In other words, one part of the light incident on the microcapsules 40 is scattered by the dispersion particles 5, and other parts of the light incident on the microcapsules 40 are adsorbed by the contact particles 50. Therefore, the displayed color becomes the gray color of the predetermined gradation when viewed from the display surface side thereof.

Although there is no particular limitation in controlling the display device 20, the display device 20 may be controlled in the following manner. For example, a state that the contact particles 50 are positioned near the first electrodes 3, i.e. a state that the white color is displayed, or a state that the contact particles 50 are positioned near the second electrode 4, i.e., a state that the black color is displayed, is set as an initial state (a reference state).

In order to display the specified intermediate tone, it is preferred that the display device 20 is first restored to the initial state, and then the pulse voltage is applied to between the first electrodes 3 and the second electrode 4.

The reason for this is that it is possible to reliably restore the display device 20 to the initial state by, e.g., applying an electrical voltage to between the first electrodes 3 and the second electrode 4 for a sufficient time (namely, there is no need to finely adjust magnitude and an application time of the electrical voltage which is applied to between the first electrodes 3 and the second electrode 4 to restore the display device 20 to the initial state), and that it is possible to reliably display the desired intermediate tone by applying the pulse voltage in the initial state.

As another control method, it may also be preferred that the display device 20 is constructed to apply a pulse voltage required in changing a current display state that the intermediate tone is displayed into a display state that the desired intermediate tone is to be displayed.

The reason for this is that the display device 20 is capable of reliably displaying the intermediate tone, and that the desired intermediate tone can be reliably displayed even if the current display state is not restored to the initial state but successively changed into a state that the desired intermediate tone is to be displayed.

In this regard, it is to be noted that the electrical voltage applied to between the first electrodes 3 and the second electrode 4 is not limited to a single pulse voltage, but may be multiple pulse voltages with same polarities, or multiple pulse voltages with alternately changing polarities (alternating voltages), or the like.

In a case where the dispersion particles 5 are electrically charged in the opposite polarity as that of the contact particles 50, if the electrical voltage is applied to between the first electrodes 3 and the second electrode 4, the dispersion particles 5 are electrophoresed toward the opposite electrode to an electrode toward which the contact particles 50 are electrophoresed.

However, if the application of the electrical voltage is stopped between the first electrodes 3 and the second electrode 4, the dispersion particles 5 are re-dispersed in the liquid-phase dispersion medium 6. This case exhibits the same function as that of a case where the dispersion particles 5 are not electrically charged.

As shown in FIG. 3, the display device 20 is constructed to ensure that the attractive force ($f_2$ in FIG. 3) due to the interaction between the contact particles 50 and the capsule body 401 is greater than the electrostatic force ($f_1$ in FIG. 3) acting on the contact particles 50 due to the electrical fields generated between the first electrodes 3 and the second electrode 4.

The attractive force ($f_2$) due to the interaction between the contact particles 50 and the capsule body 40 is a sum (the resultant force) of attractive forces occurring due to interactions among others contact particles 50, dispersion liquid 10, and the capsule body 401, when the predetermined contact particles 50 are focused. That is, the attractive forces are the sum of the following three forces.

The first force is electrostatic force (attractive force) occurring due to the net charges (which include the electrical charges of the contact particles 50) existing inside the capsule body 401 (not include the capsule body 401 in itself).

The second force is van der Waals' force (attractive force) occurring between the contact particles 50 and the capsule body 401. The third force is repulsive force occurring due to osmotic pressure (which is generated by a steric stabilization treatment using a graft polymer).

The task of making the attractive force ($f_2$) greater than the electrostatic force ($f_1$) can be accomplished by suitably setting, e.g., a charge amount of the respective parts, charge density of the respective parts, namely, the net charge amount inside the capsule body 401, or magnitude of the electrical voltage applied to between the first electrodes 3 and the second electrode 4.

Therefore, when the electrical voltage is applied to between the first electrodes 3 and the second electrode 4 and when the electrical fields generated therebetween act on the contact particles 50, the resultant force ($f_3$ in FIG. 3) of the electrostatic force ($f_1$) and the attractive force ($f_2$) acts in a direction as shown in FIG. 3.

This makes it possible to prevent the contact particles 50 from moving away from the capsule body 401, which ensures that the contact particles 50 are reliably moved along the inner surface of the capsule body 401 while maintaining the contact state.

The phenomenon that the contact particles 50 are moved along the inner surface of the capsule body 401 while maintaining the contact state is quite complex in view of a microscopic standpoint, as will be described below.

More specifically, a relationship (the attractive force, and repulsive force, etc.) between the contact particles 50 and the capsule body 401 is significantly complex. The interactions among predetermined contact particles 50, other contact particles 50, the dispersion liquid 10, and the capsule body 401 can be explained using a potential curve illustrated in FIG. 4.

As illustrated in FIG. 4, in the potential curve, a valley of potential is created when summing up the electrostatic force occurring due to the net charges existing inside the capsule body 401, the van der Waals' force occurring between the contact particles 50 and the capsule body 401, and the repulsive force occurring due to the osmotic pressure.

When a distance between a surface of each of the contact particles 50 and the inner surface of the capsule body 401 is $Z_0$ in FIG. 4, the contact particles 50 are held to the inner surface of the capsule body 401 in a position in which the surface of each of the contact particles 50 are spaced apart from the inner surface of the capsule body 401 by the distance $Z_0$. The distance $Z_0$ is on the order of nanometers. In this case, if the surfaces of the contact particles 50 have polymer chains, the polymer chains of the contact particles 50 and the capsule body 401 are in contact with each other.

If electrical fields are generated between the first electrodes 3 and the second electrode 4 in this state, the contact particles 50 are easily moved away from the inner surface of the capsule body 401. This is because a slope of the potential curve is zero in the position spaced apart by the distance $Z_0$.

As the contact particles 50 approach a position spaced apart by a distance $Z_1$, however, the slope of the potential curve becomes greater, thereby allowing an increased attractive force to act on the contact particles 50. Thus, the contact particles 50 are no longer able to move away from the inner surface of the capsule body 401 and, instead, are moved toward the inner surface of the capsule body 401.

As a result, if the electrical fields are generated between the first electrodes 3 and the second electrode 4, the contact particles 50 move along the inner surface of the capsule body 401. At this time, each of the contact particles 50 moves along the inner surface of the capsule body 401 while slightly changing the distance between the surface thereof and the inner surface of the capsule body 401 (while slightly bouncing up and down on the inner surface of the capsule body 401) as illustrated in FIG. 5.

In this embodiment, the capsule body (the shell) 401, into which the dispersion liquid 10 and the contact particles 50 are encapsulated, includes a first capsule layer (a first layer) 402 with the inner surface and a second capsule layer (a second layer) 403 arranged outside the first capsule layer 402, as shown in FIG. 1.

The first capsule layer 402 and the second capsule layer 403 are respectively formed into a spherical shell shape (a shell-like shape). An outer surface of the first capsule layer 402 is covered with the second capsule layer 403. This makes it possible to synergistically impart characteristics of the first capsule layer 402 and the second capsule layer 403 to the capsule body 401.

In the capsule body 401, one or both of the first capsule layer 402 and the second capsule layer 403 may be electrically charged, or may not be electrically charged.

Examples of a constituent material of each of the first capsule layer 402 and the second capsule layer 403 include a material containing gum such as gum arabic or the like, a composite material of gum arabic and gelatin, various kinds of resin materials such as an urethane-based resin, an acryl-based resin, an epoxy-based resin, a melamine-based resin, an urea-based resin, polyamide and polyether, and the like. One or more of them can be used independently or in combination.

A cross-linking agent may be added to the resin of which each of the first capsule layer 402 and the second capsule layer 403 is made, so that the first capsule layer 402 and the second capsule layer 403 can have a cross-linked (three-dimensionally cross-linked) structure. This makes it possible to increase strength of each of the first capsule layer 402 and the second capsule layer 403. As a consequence, it is possible to surely prevent the microcapsules 40 from being collapsed.

In this regard, charging or non-charging, a charge amount, charge density and a polarity of each of the first capsule layer 402 and the second capsule layer 403 are also affected by the liquid-phase dispersion medium 6. Therefore, the constituent material (the combination of components of the constituent material), a mixing ratio of the components and various forming conditions of each of the first capsule layer 402 and the second capsule layer 403 are suitably set depending on the liquid-phase dispersion medium 6 to be used.

By doing so, the net charges are existed within the capsule body 401, while adjusting the charge amount and the polarity thereof. In this case, additives such as a charging agent and the like may be added to the constituent material of each of the first capsule layer 402 and the second capsule layer 403.

Further, it is preferred that the first capsule layer 402 and the second capsule layer 403 are chemically bonded together in their interfacial surfaces. This makes it possible to reliably prevent any separation of the first capsule layer 402 and the second capsule layer 403 even when pressure is applied to between the circuit board 22 and the display sheet 21.

As a result, it is possible to reliably prevent the microcapsules 40 from being collapsed due to the pressure applied at the time of bonding the microcapsule-containing layer 400 and the circuit board 22 together or due to an impact and a pressing force applied when the microcapsules 40 are used and stored as the display device 20.

A thickness of the capsule body 401 (a total sum of a thickness of the first capsule layer 402 and a thickness of the second capsule layer 403 in this embodiment) is not particularly limited to a specific value, but may be preferably in the range of 0.1 to 5 μm, more preferably in the range of 0.1 to 4 μm, and even more preferably in the range of 0.1 to 3 μm in a wet state.

If the thickness of the capsule body 401 is too small, there is a fear that great enough capsule strength of the capsule body 401 may not be obtained depending on combination of the constituent materials of the first capsule layer 402 and the second capsule layer 403.

In contrast, if the thickness of the capsule body 401 is too great, there is a fear that the transparency may be reduced depending on the combination of the constituent materials of the first capsule layer 402 and the second capsule layer 403, which may lead to reduction in the display contrast of the display device 20.

Although the capsule body 401 has two layers consisting of the first capsule layer 402 and the second capsule layer 403 in this embodiment, the capsule body 401 is not limited to this two layer construction, but may have a single layer construction or a multiple layer construction with three or more layers.

As for an outer particle size (outer diameter) of the capsule body 401, a volume-average particle size (average value) thereof is preferably in the range of 20 to 60 μm, more preferably in the range of 20 to 50 μm, and even more preferably in the range of 30 to 45 μm. If the outer particle size of the capsule body 401 falls within such a range, it is possible to form the microcapsule-containing layer 400 with increased dimensional accuracy. In this regard, it is to be noted that the outer particle size of the capsule body 401 is the same as an outer particle size of microcapsule 40.

In this case, if the outer particle size of the capsule body 401 is smaller than the lower limit value noted above, the amount of the contact particles 50 or the dispersion particles 5 has to be reduced. For example, the white particles reduce property of concealing the black particles when the white display. As a result, the white color is not displayed clearly (e.g. a gray color), and therefore there is a fear that the display contrast of the display device 20 is reduced.

In contrast, if the outer particle size of the capsule body 401 is greater than the upper limit value noted above, the gaps among the microcapsules 40 and between the base substrate 12 and the opposite substrate 11 (circuit substrate 22) grows smaller. That is, a number of the microcapsules included in the microcapsule-containing layer is reduced. Therefore, the capsule body 401 is crashed easily. As a result, there is a fear that the display contrast of the display device 20 is reduced.

It is preferred that the microcapsules 40 are formed to have a generally uniform or equal size (particle size).

More specifically, a coefficient of variation (a CV value) of the outer diameters (particle diameter) of the microcapsules 40 (capsule body 401) is preferably 20% or less, more preferably 15% or less, and even more preferably 10% or less.

A lower limit value of the CV value of the outer diameters (particle diameter) of the microcapsules 40 is preferably 3%. In this regard, it is to be noted that the CV value is a value in which a standard deviation (σ) of the outer diameters of the microcapsules 40 is divided by an average value thereof. If the CV value is too small, the width of a particle size distribution (particle diameter distribution) of the microcapsules 40 is small so that the outer diameters of the microcapsules 40 are uniform.

If the CV value of the outer diameters of the microcapsules 40 exceeds the upper limit value noted above, the shapes of the relative large microcapsules 40 become flattened, so that it becomes difficult for the contact particles 50 to move along the inner surface of the capsule body 401 as described above.

Figure 22:
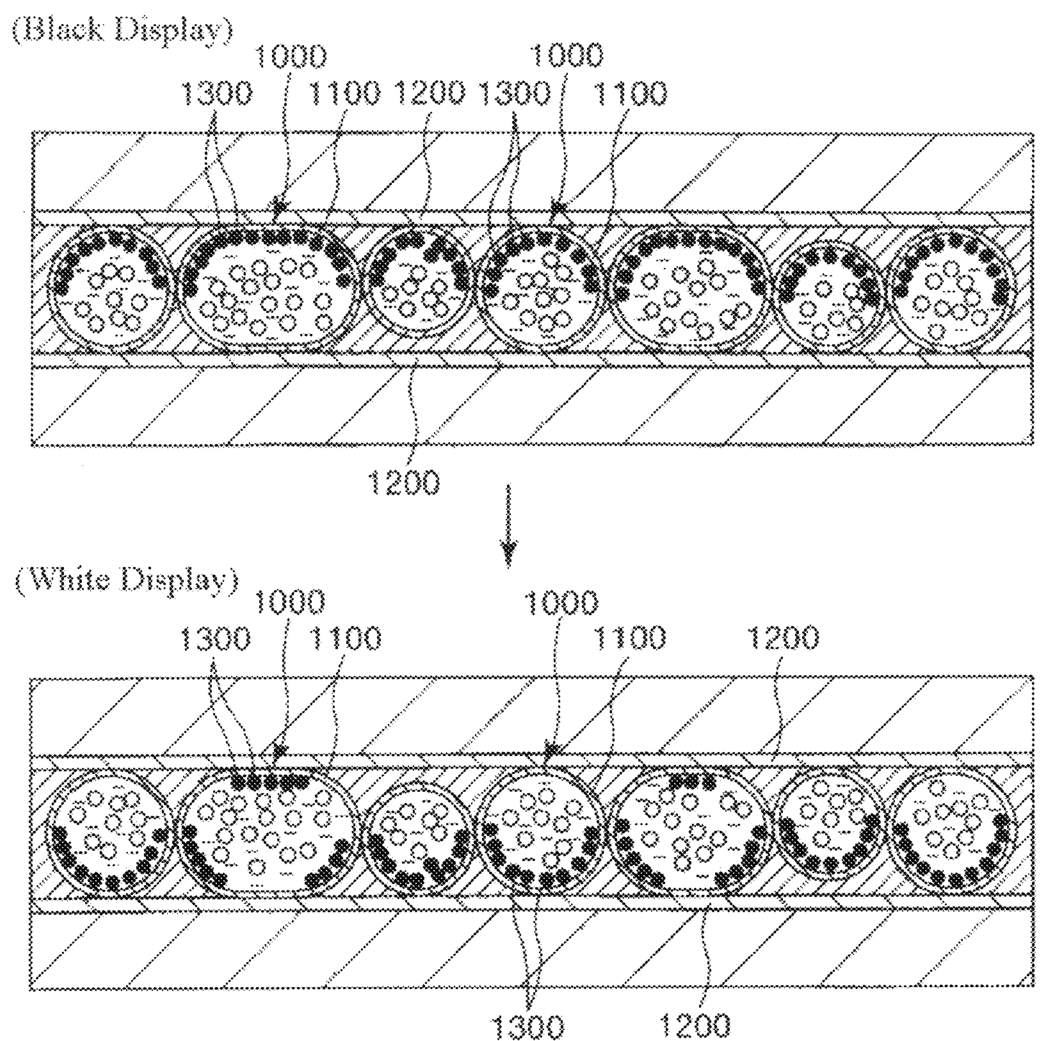
FIG. 22 is a vertical section view (section-side view) schematically showing a display device operating with an electrocrawling method.

As described above, the display color of the display device 20 becomes the gray color as shown in FIG. 22. That is, if the white color is to be displayed after displaying the black color, the black particles 1300 which are the contact particles 50 being into contact with (attaching to) the upper inner surface (flat surface) remain to the upper inner surface.

In other words, a phenomenon, that the display color of the middle region of each of the microcapsules 40 becomes the black color as viewed the display surface side of the display device 20, occurs. This makes it possible to display a gray color.

On the contrary, although not shown in draws, if the black color is to be displayed after displaying the white color, the black particles 1300 cannot be moved to the upper inner surface so that the display color becomes the gray color. As a result, the display contrast is reduced.

If the CV value of the outer diameters of the microcapsules 40 is smaller than the lower limit value noted above, a structure of the microcapsules 40 becomes a close-packed structure in a microcapsule coating material obtained by mixing the binder 41 and the microcapsules 40. Therefore, flowability of the microcapsule coating material is lowered so that it becomes difficult that the microcapsule coating material is applied onto the base substrate 12.

The standard deviation (σ) of the outer diameters of the microcapsules 40 is preferably 4 μm or less, more preferably 3 μm or less, and even more preferably 2 μm or less. It is preferred that a lower limit value of the standard deviation (σ) of the outer diameters of the microcapsules 40 is 0.6 μm.

If the standard deviation (σ) of the outer diameters of the microcapsules 40 exceeds the upper limit value noted above, the shapes of the relative large microcapsules 40 become partially flattened, so that it becomes difficult for the contact particles 50 to move along the inner surface of the capsule body 401.

As described above, the display color of the display device 20 becomes the gray color as shown in FIG. 22. That is, if the white color is to be displayed after displaying the black color, the black particles 1300 which are the contact particles 50 being into contact with (attaching to) the upper inner surface (flat surface) remain to the upper inner surface. As a result, the display color of the display device 20 becomes the gray color.

On the contrary, although not shown in draws, if the black color is to be displayed after displaying the white color, the black particles 1300 cannot be moved to the upper flat inner surface so that the display color becomes the gray color. As a result, the display contrast is reduced.

If the standard deviation (σ) of the outer diameters of the microcapsules 40 is smaller than the lower limit value noted above, the structure of the microcapsules 40 becomes the close-packed structure in the microcapsule coating material obtained by mixing the binder 41 and the microcapsules 40. Therefore, the flowability of the microcapsule coating material is lowered so that it becomes difficult that the microcapsule coating material is applied onto the base substrate 12.

When viewed from a side surface of the display device 20 (a vertical direction to the sheet of FIG. 1), an average roundness R of the microcapsules 40 represented by the following formula (I) is preferably in the range of 0.88 to 1, more preferably in the range of 0.90 to 1, and even more preferably in the range of 0.90 to 0.99.

If the average roundness R is smaller than the lower limit value noted above, it becomes difficult for the contact particles 50 to move along the inner surface of the capsule body 401, depending on other conditions. As a result, the display contrast is reduced.

$$R=L_0/L_1 \quad (I)$$

$L_1$ (μm) represents a circumference of a projected image of the microcapsule 40 that is a subject of measurement, and $L_0$ (μm) represents a circumference of a perfect circle (a geometrically perfect circle) having the same area as that of the projected image of the microcapsule 40 that is a subject of measurement.

As will be set forth later, the display device 20 is generally manufactured by interposing the adhesive agent layer 8 between the circuit board 22 and the display sheet 21 and bonding the circuit board 22 and the display sheet 21 together under that state. The bonding is performed in a state that the circuit board 22 and the display sheet 21 are kept in close proximity to each other. Pressure is applied to between the circuit board 22 and the display sheet 21 in order to bring them into close proximity to each other.

Further, when the display device 20 of the present invention is incorporated into an electronic paper that requires flexibility, flexural deformation occurs in the display device 20 each time the electronic paper is flexed. Every time the flexural deformation occurs, pressure is applied to between the circuit board 22 and the display sheet 21.

The microcapsules 40 have strength great enough to keep a spherical shape between the second electrode 4 and the adhesive agent layer 8 even when the pressure is applied to between the circuit board 22 and the display sheet 21. This makes it possible to increase pressure resistance and bleed resistance of the microcapsules 40, thereby ensuring that the display device 20 is stably operated for an extended period of time.

The term "pressure resistance of the microcapsules 40" used herein refers to a property with which the microcapsules 40 resist the pressure applied thereto without being crushed. The term "bleed resistance of the microcapsules 40" used herein refers to a property with which the liquid-phase dispersion medium 6 contained in the microcapsules 40 is kept against dissipation to the outside.

Next, a description will be made on a principle of displaying information (images) in the display device 20 based on FIGS. 9A to 9E.

Figure 9A:
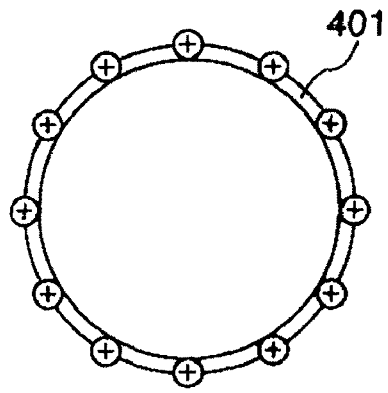
FIGS. 9A to 9E are pattern diagrams (section views) for explaining a principle of the display device shown in FIG. 1.

FIG. 9A shows a state that the capsule body 401 of the spherical shell shape is uniformly positively charged. The state can be referred to as a state that the capsule body 401 is electrically charged by the static electricity. In this sate, no electrical fields are generated inside the capsule body 401, which is obvious from Gauss law.

This may be interpreted as that the sum of the electrical fields becomes zero by compensating the electrical fields, which are made by the electrical charges on the capsule body 401, to each other at all points on the capsule body 401. Therefore, even if a dispersion liquid containing particles having negative zeta potential (negatively-charged particles) is introduced into the capsule body 401, the particles contained in the dispersion liquid are not attracted to the inner surface of the capsule body 401 by the static electricity.

In this regard, JP-A 2006-343782 discloses the configuration of the display device as described above. In the configuration of the display device, particles inside the capsule body are not attracted to the inner surface of the capsule body by the principle (theory) described above.

In FIG. 9A, the particles contained in the dispersion liquid are negatively charged. In this case, if the particles are surrounded by counter ions having the opposite polarity as that of the particles, namely, positive ions, the dispersion liquid are electrically neutral when considering at the whole dispersion liquid. In other words, the sum of the electrical charges inside the capsule body 401 is zero (net charges do not exist inside the capsule body 401).

Figure 9B:
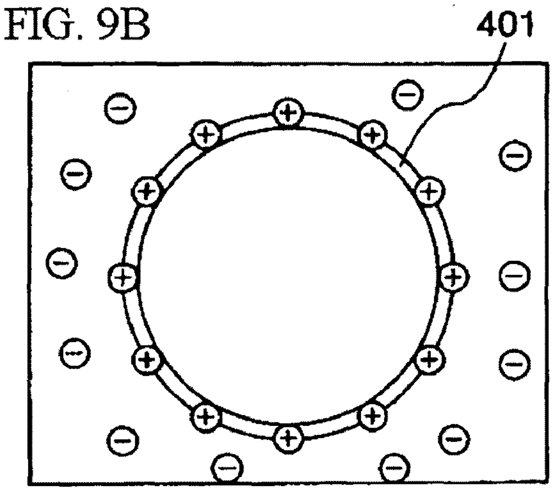

FIG. 9B shows not a mechanism by the static electricity but a mechanism by dissociation of salts as a mechanism of electrically charging the capsule body 401. In a system in which a liquid involves, that is, in the mechanism by the dissociation of the salts, the capsule body 401 is dominantly electrically charged by the mechanism.

In FIG. 9B, the salts are dissociated to the ions including cations and anions, and then the cations (positive ions) are preferentially taken (adsorbed) in the capsule body 401, and the anions (negative ions) are suspended in water or the binder which surrounds the capsule body 401. FIG. 9B shows such a phenomenon.

In a method of manufacturing microcapsules filled with a nonaqueous liquid, it is general that a nonaqueous solvent (dispersion medium) is emulsified in water, and therefore O/W type emulsion is made. Therefore, the ions dissociated in water are selectively adsorbed to the capsule body 401 as shown in FIG. 9B so that the whole capsule body 401 is electrically charged with ease.

However, in this case, effective electrical fields to attract the particles to the inner surface of the capsule body 401 are not generated inside the capsule body 401. The reason is the same as that described in the explanation in FIG. 9A as described above. That is, the reason is that the sum of the electrical fields becomes zero by compensating the electrical fields, which are made by the electrical charges on the capsule body 401, to each other.

Therefore, even if the particles having negative zeta potential is introduced into the capsule body 401, the particles are not attracted to the inner surface of the capsule body 401 by the static electricity.

Figure 9C:
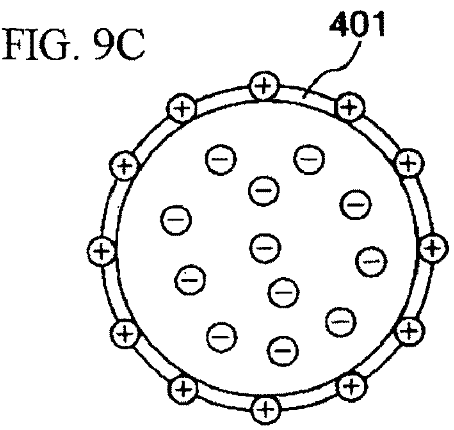

FIG. 9C shows that the salts are dissociated to the ions including the cations and the anions, and then the cations are preferentially taken (adsorbed) in the capsule body 401 like FIG. 9B. In this regard, it is to be noted that the dissociation to the ions occurs in the liquid included in the capsule body 401, and therefore the anions are included in the capsule body 401.

In this configuration, an electrical double layer is formed on a boundary between the liquid included in the capsule body 401 and the capsule body 401. As a result, the electrical fields are generated inside the capsule body 401.

Therefore, if the particles having negative zeta potential is introduced into the capsule body 401, the particles are moved toward the inner surface of the capsule body 401, and then the particles are in contact with (adhere to) the inner surface thereof.

Apparently, the particles look like that the particles are absorbed to the inner surface of the capsule body 401 by the static electricity (attractive force) between the particles and the cations which are adsorbed to the inner surface of the capsule body 401. However, as described above, the sum of the electrical fields which are made by the electrical charges on the capsule body 401 is zero. Therefore, force (biasing force) of allowing the particles to adhere to the inner surface of the capsule body 401 is obtained due to the anions which are dispersed in the liquid contained in the capsule body 401.

In other words, the particles are not attracted by the capsule body 401, but are pushed (adsorbed) to the inner surface of the capsule body 401 by the repelling force (repulsive force) occurring due to the static electricity between the anions and the particles.

Figure 9D:
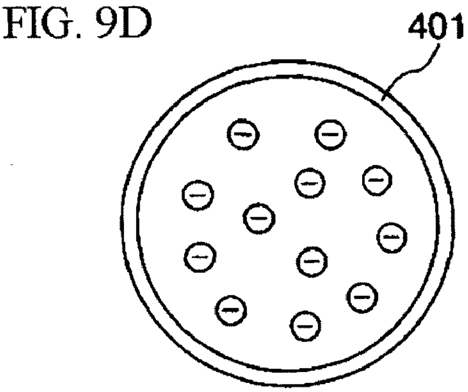

As shown in FIG. 9D, the capsule body 401 are not electrically charged, and the liquid included in the capsule body 401 has electrical charges. Even in such a case, the effective electrical fields are generated inside the capsule body 401 as the case shown in FIG. 9C. In a case where the electrical charges of the liquid included in the capsule body 401 are negative as shown in FIG. 9D, if the particles having negative zeta potential is introduced into the capsule body 401, the particles are moved toward the inner surface of the capsule body 401, and then the particles are in contact with (adhere to) the inner surface thereof.

In this way, in order to bring the particles into contact with the inner surface of the capsule body 401, the sum of the electrical charges inside the capsule body 401 is not zero, and it is required that the polarity of the electrical charges is the same as that of the particles.

Therefore, in a case where the salts contained in the liquid in the capsule body 401 are dissociated, and the anions and cations remain inside the capsule body 401, the sum of the electrical charges in the capsule body 401 becomes zero. Therefore, force, in which the particles are in contact with the inner surface of the capsule body 401 and which is needed to the present invention, is not generated.

Figure 9E:
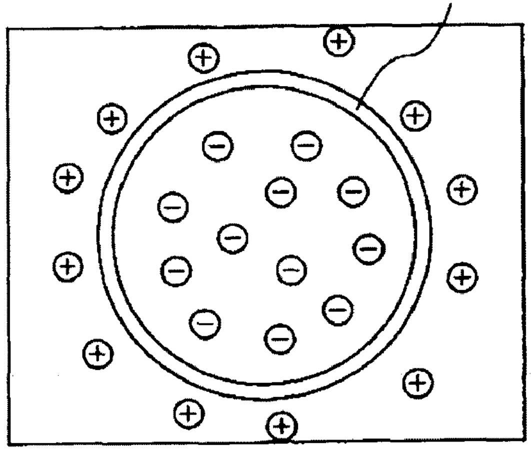

However, as shown in FIG. 9E, in a case where either the cations or the anions which are dissociated in the capsule body 401 are selectively spread outside the capsule body 401, the sum of the electrical charges in the capsule body 401 becomes non-zero. Therefore, the effective electrical fields are generated inside the capsule body 401.

Of course, salts which have existed outside the capsule body 401 are dissociated, thereby generating the anions and the cations. FIG. 9E shows a case where the anions are selectively spread inside the capsule body 401, and therefore the anions are in equilibrium with the cations outside the capsule body 401. In such a case, the effective electrical fields are generated inside the capsule body 401. Since the capsule body 401 is generally formed by a polymer, it is possible for the ions to spread inside or outside the capsule body 401 without large faults.

As described above, the microcapsules filled with the non-aqueous liquid are manufactured through the step of emulsifying the liquid in water. In a case where salts, which are dissociated to cations having high hydrophilic property and anions having high hydrophobic property, are introduced into the microcapsules in this step, an equilibrium condition is obtained as shown in FIG. 9E. In this case, the whole microcapsule is observed so as to be negatively charged in water.

As described above, the electrical fields inside the capsule body 401 needed to the display device 20 operating with the electro-crawling method according to the present invention are not generated by the electrical charges on the capsule body 401.

In other words, in a case where the net charges of which polarity is the same as that of the particles exist inside the capsule body 401, the electrical fields are generated. Such electrical fields develop electrostatic force to act on pushing (pressing) the particles to the inner surface of the capsule body 401.

Next, a description will be made on a concrete (first to fourth) configuration examples based on FIGS. 10 to 13. In this description, the colored particles 50 will be described as black particles 51.

First, as shown in FIG. 14, in a conventional display device, counter ions (cations) exist around the negatively-charged black particles 51 in the microcapsule, and therefore an electrically-neutral state is maintained in the microcapsule. This electrically-neutral state is represented by FIG. 14. FIG. 14 shows that a number of the anions adsorbing to the black particles 51 is the same as that of the counter ions.

In this case, electrical fields which are made by the electrical charges of the black particles 51 and act on among the black particles 51 are blocked by electrical fields which are made by the electrical charges of the counter ions. As a result, the electrical fields which are made by the electrical charges of the black particles 51 and the electrical fields which are made by the electrical charges of the counter ions are compensated to each other.

Therefore, repulsive force does not act on among the black particles 51 except for a case where the black particles approach to each other by a distance of a micro level. Consequently, a state in which the black particles 51 are dispersed in the liquid filled in the microcapsule 40 is maintained as shown in FIG. 14.

In the first configuration example shown in FIG. 10, the black particles 51 are in contact with (adhere to) the inner surface of the capsule body 401 by introducing anions and cations (which are represented by the symbol "−" or "+" in the symbol "○", respectively), which are derived from another kind of salts, in addition to anions and cations (which are represented by the symbol "−" or "+" in the symbol "□", respectively), which are due to the charge of the black particles 51, in the microcapsule 40.

The cations (which are represented by the symbol "+" in the symbol "○"), which are derived from another kind of salts, are taken into the capsule body 401 in itself. The anions (which are represented by the symbol "−" in the symbol "○"), which are derived from another kind of salts, remain in the liquid included in the capsule body 401.

The effective electrical fields are generated in the capsule body 401 due to the negative net charges, namely the charges of the anions which are dispersed in the liquid included in the capsule body 401. Therefore, the black particles 51 are pushed to the inner surface of the capsule body 401.

In this regard, it is to be noted that the dispersion particles (white particles) 5 of which color (color hue) is different from the black color are omitted in FIG. 10 (and FIGS. 11 to 13 alike). The dispersion particles are not electrically charged or electrically charged in the opposite polarity (positive) as that of the black particles 51. Therefore, the dispersion particles 5 are maintained in a state of dispersing within the capsule body 401.

Depending on distribution of the ions in the liquid included in the microcapsule 40, the dispersion particles 5 are positioned in the neighborhood of the black particles 51 held to the inner surface of the capsule body 401, far from the inner surface of the capsule body 401, or the like. In this way, the dispersion particles 5 are distributed in various kinds of states.

In the second configuration example shown in FIG. 11, cations (which are represented by the symbol "+" in the symbol "○"), which are derived from another kind of salts, are diffused in the binder 41. Anions (which are represented by the symbol "−" in the symbol "○"), which are derived from another kind of salts, remain in the liquid included in the capsule body 401. This makes it possible to exit the negative net charges inside the capsule body 401.

As the first configuration example shown in FIG. 10, the effective electrical fields are generated in the capsule body 401 due to the negative net charges, namely the charges of the anions which are dispersed in the liquid included in the capsule body 401. Therefore, the black particles 51 are pushed to the inner surface of the capsule body 401.

In the third and fourth configuration examples shown in FIGS. 12 and 13, ions (cations and anions), which are derived from another kind of salts, are not needed, respectively. In other words, only an ion pair which is involved to the black particles 51 to be electrically charged is needed.

Such an ion pair includes anions which are represented by the symbol "−" in the symbol "□" and cations which are represented by the symbol "+" in the symbol "□". The anions are selectively adsorbed to the black particles 51. As a result, the black particles 51 are negatively charged.

Generally, an electrically-neutral state is maintained by allowing the cations (counter ion) to exist around the black particles 51. However, in the third configuration example shown in FIG. 12, parts of the cations are taken into the capsule body 401 in itself. As a result, negative net charges exist inside the capsule body 401. The effective electrical fields are generated inside the capsule body 401 due to the negative net charges, and therefore the black particles 51 are pushed to the inner surface of the capsule body 401.

This may be interpreted as that the repulsive force occurring due to the electrostatic force acts on among the black particles 51, as a result, the black particles 51 are pushed to the inner surface of the capsule body 401 by repelling to each other.

In the fourth configuration example shown in FIG. 13, only the ion pair which is involved to the black particles 51 to be electrically charged is needed. Such an ion pair includes anions which are represented by the symbol "−" in the symbol "□" and cations which are represented by the symbol "+" in the symbol "□". Parts of the cations are taken in the binder 41.

As the third configuration example shown in FIG. 12, effective electrical fields are generated inside the capsule body 401 due to the negative net charges existing inside the capsule body 401. Therefore, the black particles 51 are pushed to the inner surface of the capsule body 401.

2. Operating Method of Display Device

Such a display device 20 is operated as follows.

Hereinafter, a method of operating the display device 20 will be described with reference to FIG. 6. The following description will be made based on a representative instance wherein the contact particles 50 are negatively charged, the negative net charges exist inside the capsule body 401, and wherein a state that the contact particles 50 are positioned near the first electrodes 3 (namely, a state that the white color is displayed) is set as an initial state.

When displaying the white color, an electrical voltage is applied to between the first electrodes 3 and the second electrode 4 so that the first electrodes 3 can be in a positive potential with respect to the second electrode 4. For the purpose of reliability, it is preferred that the electrical voltage is applied for a time long enough to allow the contact particles 50 to move from the second electrode 4 to the first electrodes 3.

As a consequence, the contact particles 50 are moved along the inner surface of the capsule body 401 toward the first electrodes 3 while maintaining the contact state until they are stopped near the first electrodes 3. On the other hand, the dispersion particles 5 are maintained in a state of dispersing into the liquid-phase dispersion medium 6.

Therefore, a state in that the dispersion particles 5 and the liquid-phase dispersion medium 6 (liquid) included in the capsule body 401 are not covered with the contact particles 50 at all is shown as viewed from the display surface side of the display device 20. That is, the state in that the contact particles 50 are not positioned near the second electrode 4 is shown as viewed from the display surface side of the display device 20 (most left drawings in FIG. 6A to 6C). Therefore, the ratio (S2/S1) becomes 0, thereby displaying the white color.

When displaying the black color, an electrical voltage is applied to between the first electrodes 3 and the second electrode 4 so that the first electrodes 3 can be in a negative potential with respect to the second electrode 4. For the purpose of reliability, it is preferred that the electrical voltage is applied for a time long enough to allow the contact particles 50 to move from the first electrodes 3 to the second electrode 4.

Consequently, the contact particles 50 are moved along the inner surface of the capsule body 401 toward the second electrode 4 maintaining the contact state until they are stopped near the second electrode 4. On the other hand, the dispersion particles 5 are maintained in a state of dispersing into the liquid-phase dispersion medium 6.

Therefore, a state in that all the dispersion particles 5 and the liquid-phase dispersion medium 6 (liquid) included in the capsule body 401 are covered with the contact particles 50 is shown as viewed from the display surface side of the display device 20.

That is, the state in that the contact particles 50 are positioned near the second electrode 4 is shown as viewed from the display surface side of the display device 20 (most right drawings in FIG. 6A to 6C). Therefore, the ratio (S2/S1) becomes 1, thereby displaying the black color.

When displaying the gray color as the intermediate tone, the display device 20 is first restored to the initial state as is the case when displaying the white color. Thereafter, the electrical voltage is applied to between the first electrodes 3 and the second electrode 4 so that the first electrodes 3 can be in a negative potential with respect to the second electrode 4.

In this case, analytical curves (e.g., arithmetic expressions, tables, etc.) showing a correlation between a gray color of different gradations (respective intermediate tones) and a voltage application time has been empirically found in advance and stored in a storage means not shown in the drawings.

Based on these analytical curves, a control means not shown in the drawings calculates a voltage application time required in obtaining the gray color of the desired gradation (the desired intermediate tone) and applies an electrical voltage for the voltage application time thus calculated.

Consequently, the contact particles 50 are moved along the inner surface of the capsule body 401 toward the second electrode 4 maintaining the contact state until they are stopped at a predetermined position.

On the other hand, the dispersion particles 5 are maintained in a state of dispersing into the liquid-phase dispersion medium 6. Therefore, a state in that a circumference portion of the dispersion particles 5 and the liquid-phase dispersion medium 6 (liquid) included in the capsule body 401 are covered with the contact particles 50 is shown as viewed from the display surface side of the display device 20.

That is, a state in that the contact particles 50 are positioned near the second electrode 4 and at the circumference portion is shown as viewed from the display surface side of the display device 20 (two drawings between the most left drawing and the most right drawing in each of FIG. 6A to 6C). Therefore, the ratio (S2/S1) becomes a predetermined value which is larger than 0 and lower than 1, thereby displaying the gray color of the desired gradation.

For example, in the second display example from the left side of drawings in each of FIGS. 6A to 6C, the relative-light gray color (near white color) is displayed. On the other hand, in the third display example from the left side of the drawings in each of FIGS. 6A to 6C, the relative-dark gray color (near black color) is displayed.

The display of each of the colors and a combination thereof makes it possible to display desired information (desired images).

It goes without saying that other colored particles (e.g., cyan (C) particles, magenta (M) particles, yellow (Y) particles, red (R) particles, green (G) particles and blue (B) particles) may be used as the contact particles 50. In this case, it is possible to display arbitrary intermediate tones between those colors and the white color in the same manner as described above.

In this case, it becomes possible to provide color display and full color display. Furthermore, colored particles of which hue is different from that of the contact particles 50 may be used as the dispersion particles 5.

3. Method of Manufacturing Display Device

The display device 20 described above can be manufactured in the following manner. Hereinafter, a method of manufacturing the display device 20 will be described with reference to FIGS. 7A to 7D and 8E to 8G.

The method of manufacturing the display device 20 illustrated in FIGS. 7A to 7D and 8E to 8G includes a microcapsule production step [A1] for producing the microcapsules 40, a microcapsule coating material preparation step [A2] for preparing a microcapsule coating material (microcapsule dispersion liquid) containing the microcapsules 40, a microcapsule-containing layer formation step [A3] for forming the microcapsule-containing layer 400 containing the microcapsules 40 on one surface of the base substrate 12, an adhesive agent layer formation step [A4] for forming the adhesive agent layer 8 on an opposite surface of the microcapsule-containing layer 400 from the base substrate 12, a bonding step [A5] for bringing the opposite substrate 11 into contact with an opposite surface of the adhesive agent layer 8 from the microcapsule-containing layer 400 and bonding the adhesive agent layer 8 and the opposite substrate 11 together, and a sealing step [A6] for forming the sealing portion 7.

The microcapsule production step [A1], the microcapsule coating material preparation step [A2] and the microcapsule-containing layer formation step [A3] constitute a microcapsule-containing layer formation step in the method of manufacturing the display device according to the present invention.

A step for producing the base substrate 12 to be prepared in the microcapsule-containing layer formation step [A3] includes a second electrode formation step for forming the second electrode 4 on the lower surface of the base portion 2.

A step for producing the circuit board 22 to be prepared in the bonding step [A5] includes a first electrode formation step for forming the first electrodes 3 on the upper surface of the base portion 1.

The second electrode formation step and the first electrode formation step constitute an electrode formation step in the method of manufacturing the display device according to the present invention. Hereinafter, a description will be made on the respective steps.

[A1] Microcapsule 40 Production Step

[A1-1] Formation of First Capsule Layer 402

First obtained are microcapsules in which the dispersion liquid 10 and the contact particles 50 are encapsulated into the first capsule layer 402. For the purpose of convenience in the description, these microcapsules will be referred to as "pre-microcapsules (microcapsule precursors)" hereinbelow.

The first capsule layer 402 can be formed by various kinds of a microcapsule production method, using a controlled liquid composed of the dispersion liquid 10 and the contact particles 50 as a core material.

The microcapsule production method (a method of encapsulating the controlled liquid into the first capsule layer 402) is not particularly limited to a specific type, but examples of the microcapsule production method include an interfacial polymerization method, an in-situ polymerization method, a phase separation method (or a coacervation method), an interfacial sedimentation method and a spray drying method. These microcapsule production methods may be suitably selected depending on the constituent material of the first capsule layer 402 or other conditions.

In this regard, a step of providing the net charges of which polarity is the same as that of the contact particles 50 in the first capsule layer 402 is not performed during the process of forming the first capsule layer 402. Instead, the step is performed after the formation of the first capsule layer 402.

If the first capsule layer 402 is electrically charged during the process of forming the same, the contact particles 50 will be pushed to and embedded in (or fixed to) the first capsule layer 402 due to the electrostatic force therebetween. Such a problem can be surely avoided by not electrically charging the first capsule layer 402.

The pre-microcapsules having a uniform size can be obtained by using, e.g., a sieving method, a filtering method or a specific gravity difference sorting method.

[A1-2] Formation of Second Capsule Layer 403

Next, the second capsule layer 403 is formed on the outer surface of each of the pre-microcapsules (the first capsule layer 402) obtained in the step [A1-1], thereby producing the microcapsules 40 which include the dispersion liquid 10 and the contact particles 50 therein.

The second capsule layer 403 can be formed by, e.g., gradually adding a resin prepolymer to a capsule dispersion liquid in which the pre-microcapsules are dispersed in an aqueous medium and causing a condensation reaction to the prepolymer adsorbed to the outer surfaces of the pre-microcapsules.

By doing so, the second capsule layer 403 is formed on the outer surface of each of the pre-microcapsules, thus producing the microcapsules 40 containing the dispersion liquid 10 and the contact particles 50.

When forming the second capsule layer 403, the net charges of which polarity is the same as that of the contact particles 50 exist within the capsule body (first capsule layer 402) 401 (step of electrically charging the capsule body 401).

In this case, the constituent material (the combination of components of the constituent material), the mixing ratio of the components and the various forming conditions of each of the first capsule layer 402 and the second capsule layer 403 are suitably set depending on the dispersion liquid 10 used. Further, charges of which polarity is the same as that of the contact particles 50 are provided in the dispersion liquid 10.

By doing so, the net charges of which polarity is the same as that of the contact particles 50 exist within the capsule body 401, that is, the first capsule layer 402, while adjusting the charge amount and the charge density thereof. Through this charging step, the contact particles 50 are in contact with the inner surface of the capsule body 401 due to the electrostatic force therebetween.

In this regard, it is needless to say that the method of providing (existing) the net charges having the same polarity as that of the contact particles 50 inside the capsule body 401 is not limited to the above method.

The microcapsules 40 having a uniform size, that is, the microcapsules 40 in which the average value, the CV value, and the standard deviation of the outer diameters fall within the above noted range, can be obtained by using, e.g., a sieving method, a filtering method or a specific gravity difference sorting method.

As set forth above, in the microcapsule production step [A1] of the method of this embodiment, the charging step for electrically charging the capsule body 401 is performed after forming the first capsule layer 402 that constitutes an inner portion of the capsule body 401.

As described above, a method of adjusting the CV value and the standard deviation of the outer diameters of the microcapsules 40 include various kinds of methods, e.g., a sieving method, a filtering method, a micro emulsifying method using a micro reactor, an inkjet method and a specific gravity difference sorting method.

In particular, the micro emulsifying method or the inkjet method is preferably used. The inkjet method is a method of ejecting a preparing liquid constituted of the dispersion liquid 10 and the contact particles 50 from nozzles of a droplet ejection head. The use of these methods makes it possible to produce the microcapsules 40 having a small CV value and a small standard deviation of the outer diameters thereof without the use of sieving method or the like.

In this regard, it needless to say that the sieving method, the filtering method, and the specific gravity difference sorting method may be used at the same time with the micro emulsifying method or the inkjet method.

Next, an easy description will be made on a method using the micro reactor.

Figure 15:
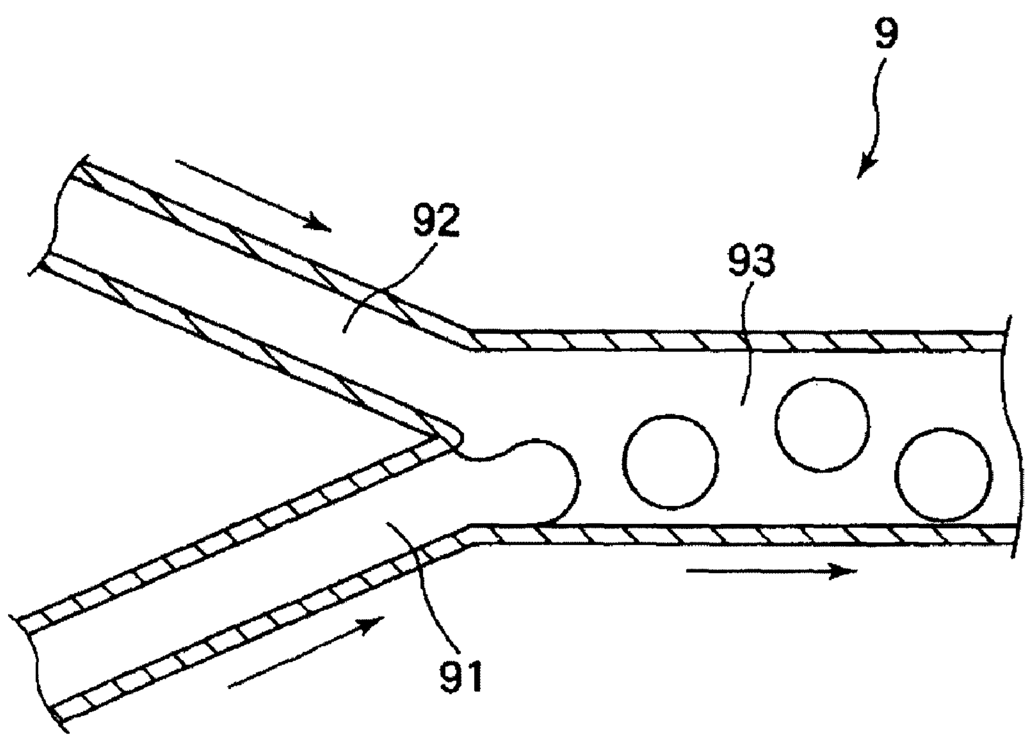
FIG. 15 is a section view schematically showing a configuration example of a major part of a micro reactor 9.

FIG. 15 is a section view schematically showing a configuration example of a major part of a micro reactor 9. Hereinafter, the left side in FIG. 15 will be referred to as "one end" and the right side will be referred to as "the other end" for the purpose of convenience in the description.

As shown in FIG. 15, the micro reactor 9 has a first tube (flow path) 91, a second tube (flow path) 92, and a third tube (flow path) 93, which have a small inner diameter, respectively. The other ends of the first tube 91 and the second tube 92 are connected to each other, and are connected with one end of the third tube 93.

A preparing liquid constituted of the dispersion liquid 10 and the contact particles 50 flows in the first tube 91. A liquid, which is needed to emulsify an emulsifying agent and the like, flows in the second tube 92. The preparing liquid and the liquid are joined together at the one end of the third tube 93. At that time, the preparing liquid flows in the third tube 93 in a form of spherical droplets having a predetermined size.

If conditions such as a flow rate of the preparing liquid, a flow rate of the emulsifying agent, and the like are adjusted, the preparing liquid can be adjusted in a predetermined size. Thereafter, pre-microcapsules in which the dispersion liquid 10 and the contact particles 50 are encapsulated in the first capsule layer 402 are obtained through predetermined steps. Then, the microcapsules 40 are obtained as described above.

According to the method, it is possible to produce microcapsules 40 having a small CV value and a small standard deviation of the outer diameters without classifying the microcapsules 40 using the filtering method and the like. Therefore, it is possible to obtain the microcapsules 40 with a high yield.

Next, an easy description will be made on the inkjet method. The preparing liquid constituted of the dispersion liquid 10 and the contact particles 50 is introduced into a droplet ejection head provided with a droplet ejection apparatus which is placed under the atmosphere. Next, droplets of the preparing liquid are ejected from nozzles of the droplet ejection head to a solution in which the emulsifying agent is dissolved.

This makes it possible to obtain droplets of the preparing liquid in a form of spherical droplets having a predetermined size in the solution. An ejection rate of the droplets is preferably 8 m/s or less, and more preferably 4 m/s or less. By setting the ejection rate of the droplets as described above, it is possible to prevent (or suppress) satellites from being generated.

[A2] Microcapsule Coating Material Preparation Step

Next, the binder 41 and a solvent are prepared, and then this binder 41 and the solvent are mixed with the microcapsules 40 produced in the step [A1] to thereby obtain a microcapsule coating material.

A mixing ratio of the binder 41 and the microcapsules 40 produced in the step [A1] is such that an amount of the binder 41 is preferably in the range of about 20 to 45 vol % with respect to a total amount of the microcapsules 40 and the binder 41.

If the amount of the binder 41 is smaller than the lower limit value noted above, when the microcapsule coating material is dried, there is a fear that spaces (gaps) are formed among the microcapsules 40, and therefore the microcapsules 40 are deformed under its own weight or in a circuit board 22 bonding step (A5) which will be described later according to other conditions.

If the amount of the binder 41 exceeds the upper limit value noted above, there is a fear that large gaps among the microcapsules 40 are obtained according to other conditions, and therefore the display performance such as the display contrast and the like is lowered.

An amount of the microcapsules 40 contained in the microcapsule coating material is preferably in the range of about 30 to 60 wt %, and more preferably in the range of about 40 to 60 wt %.

If the amount of the microcapsules 40 is set to fall within the above-noted range, there is provided a great advantage in that the microcapsules 40 can be moved (or rearranged) within the microcapsule-containing layer 400 in such a manner as not to overlap one another in a thickness direction thereof (namely, in such a manner as to form a single layer).

[A3] Microcapsule-Containing Layer 400 Formation Step

Figure 7A:
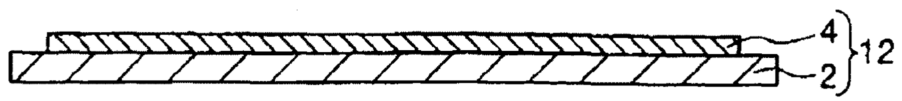
FIGS. 7A to 7D are pattern diagrams for explaining a method of manufacturing the display device shown in FIG. 1.
Figure 7B:
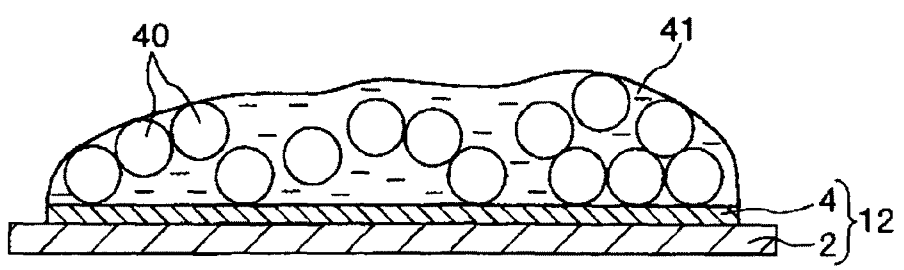

Next, the base substrate 12 is prepared as illustrated in FIG. 7A. Then, the microcapsule coating material prepared in the step [A2] is applied on the base substrate 12 as illustrated in FIG. 7B.

A method of applying the microcapsule coating material is not particularly limited to a specific type. As the method, various kinds of application methods such as an applicator method, a bar coater method, a die coater method, an air knife coater method, a kiss coater method and a gravure coater method can be used.

If necessary, the microcapsule coating material is leveled so that a thickness (a quantity) thereof can become uniform across the base substrate 12, preferably so that the microcapsules 40 can be arranged side by side (in a single layer) without overlapping one another in a thickness direction of a liquid coat composed of the microcapsule coating material.

Figure 7C:
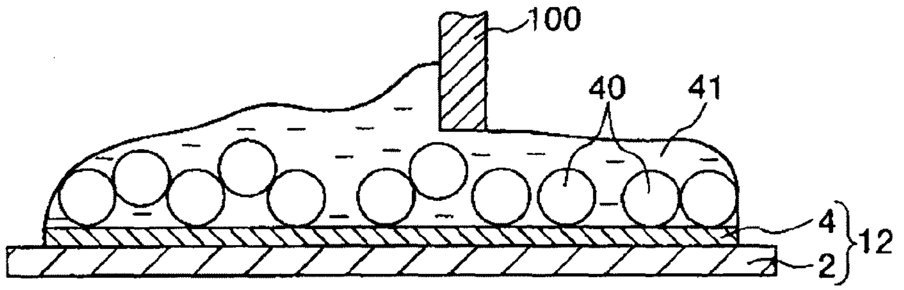
Figure 7D:
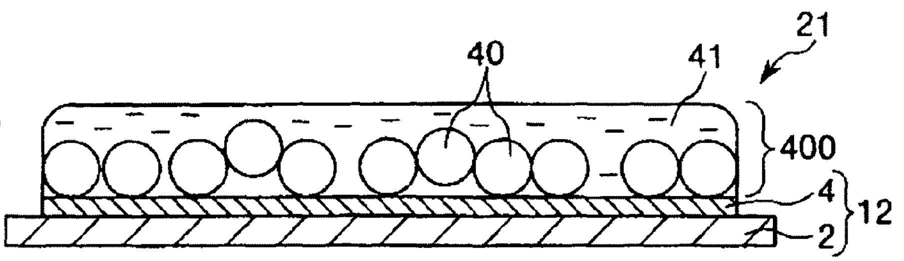

The leveling operation can be performed by, e.g., horizontally moving a squeegee (a plate-like jig) above the base substrate 12 to sweep the microcapsules 40 as illustrated in FIG. 7C. Thus, the microcapsule-containing layer 400 is formed and the display sheet 21 is obtained as illustrated in FIG. 7D. In this regard, the microcapsule coating material is introduced to a head of the die coater described above, thereby enabling the microcapsule coating material to coat.

[A4] Adhesive Agent Layer 8 Formation Step

Figure 8E:
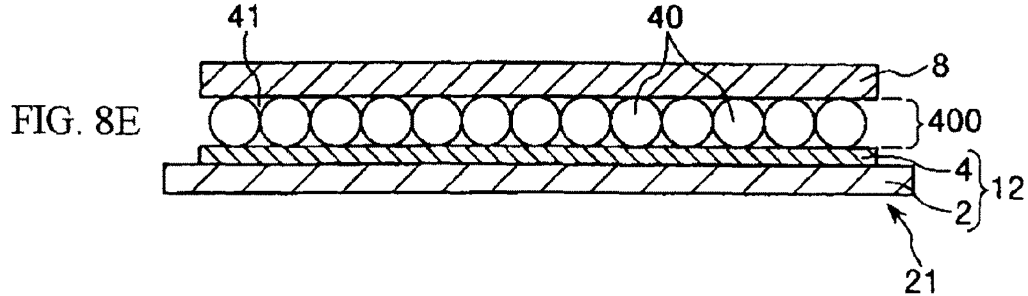
FIGS. 8E to 8G are pattern diagrams for explaining a method of manufacturing the display device shown in FIG. 1.

Next, the adhesive agent layer 8 is formed on the microcapsule-containing layer 400 as illustrated in FIG. 8E.

This step can be performed by, e.g., arranging an adhesive agent layer 8 having a sheet shape on the microcapsule-containing layer 400 using an overcoat method, a transfer method or the like.

[A5] Circuit Board 22 Bonding Step

Figure 8F:
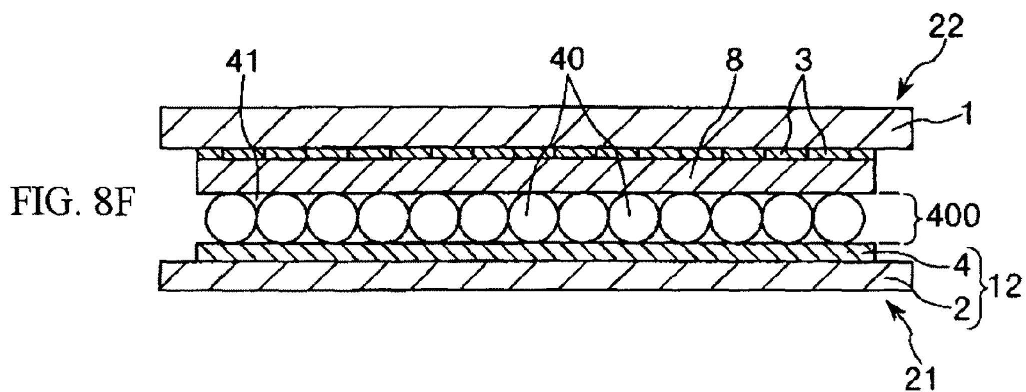

Next, as illustrated in FIG. 8F, the circuit board 22 prepared separately is laminated on the adhesive agent layer 8 so that the first electrodes 3 can come into contact with the adhesive agent layer 8. By doing so, the display sheet 21 and the circuit board 22 are bonded together through the adhesive agent layer 8.

At this time, an arrangement density of the microcapsules 40 in the microcapsule-containing layer 400 can be made uniform due to weight of the adhesive agent layer 8 and the circuit board 22 or by pressing the circuit board 22 and the display sheet 21 toward each other (by reducing the thickness of the microcapsule-containing layer 400).

When pressing the circuit board 22 and the display sheet 21 toward each other, magnitude of the pressure applied thereto is usually set equal to about 0.05 to 0.6 MPa.

However, in this display sheet 21 (this display device 20), the pressure is set to ensure that the microcapsules 40 contained in the microcapsule-containing layer 400 can be kept in a generally spherical shape without being compressed (pressed) in an up-and-down direction thereof, even if the microcapsule-containing layer 400 is pinched by the second electrode 4 and the adhesive agent layer 8 in a state that the pressure of the above noted magnitude is applied to between the circuit board 22 and the display sheet 21.

Consequently, it is possible to surely prevent collapse of the microcapsules 40 and dissipation of the dispersion liquid 10 and the contact particles 50, which would otherwise be caused by the pressure applied to between the circuit board 22 and the display sheet 21. Furthermore, it is possible for the contact particles 50 to smoothly and reliably move along the inner surface of the capsule body 401.

[A6] Sealing Step

Figure 8G:
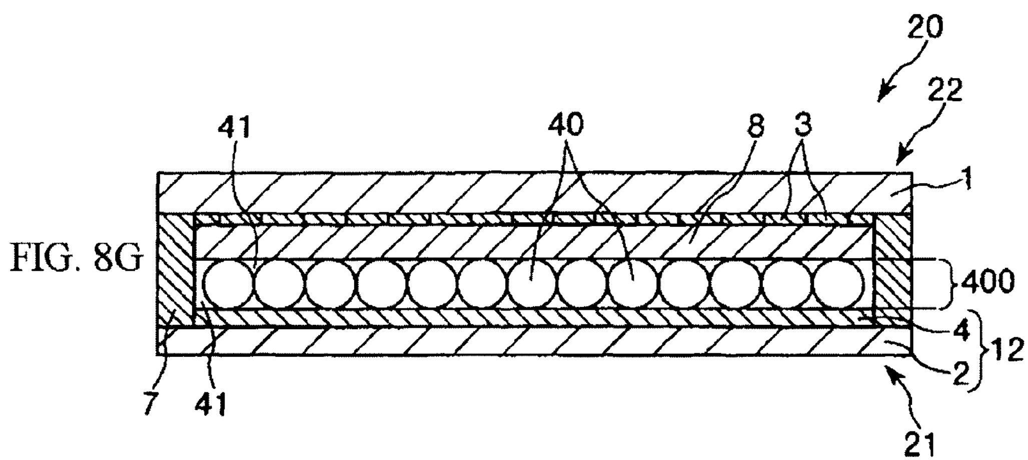

Next, as illustrated in FIG. 8G, the sealing portion 7 is formed along the edges of the display sheet 21 and the circuit board 22.

The sealing portion 7 can be formed by supplying a sealing portion formation material to between the display sheet 21 (the base portion 2) and the circuit board 22 (the base portion 1) along the edges thereof through use of, e.g., a dispenser, and then solidifying or curing the sealing portion formation material.

The display device 20 is manufactured through the steps described above.

The adhesive agent layer 8 may be arranged only on the circuit board 22 or on both of the circuit board 22 and the display sheet 21 to thereby bond the circuit board 22 and the display sheet 21 together.

It is preferred that the adhesive agent layer 8 having the sheet shape is arranged on the microcapsule-containing layer 400 by bending the same, bringing one end portion thereof into contact with microcapsule-containing layer 400 and allowing the same to progressively come into contact with the microcapsule-containing layer 400 from one end toward the other end.

By doing so, it is possible to prevent air bubbles from being left between the microcapsule-containing layer 400 and the adhesive agent layer 8, and to reliably rearrange the microcapsules 40.

The adhesive agent layer 8 may be omitted, and the display sheet 21 and the circuit board 22 may be bonded together using other methods. As one example of other methods, the display sheet 21 and the circuit board 22 may be bonded together by means of the binder 41.

According to the display device 20 described above, the contact particles 50 are always in contact with any region on the inner surface of the capsule body 401. The contact particles 50 are reliably moved along the inner surface of the capsule body 401 while maintaining the contact state. Further, the contact particles 50 and the dispersion particles 5 are not adsorbed to each other. Therefore, it is possible to easily and reliably obtain the intermediate tone.

In addition, since the contact particles 50 are in contact with the inner surface of the capsule body 401 even at the stoppage of the application of the electrical voltage to between the first electrodes 3 and the second electrode 4, it is possible to reliably maintain the individual colors including the intermediate tone. This ensures that the display content (the image) is stably maintained with no deterioration of its display state even at the stoppage of the voltage application.

Owing to the fact that the contact particles 50 are in contact with the inner surface of the capsule body 401 and further that the contact particles 50 and the dispersion particles 5 are not adsorbed to each other, it is possible to exhibit high display contrast and to improve chromatic purity.

Seeing that the contact particles 50 are moved along the inner surface of the capsule body 401 while maintaining the contact state, it is possible to reliably move the contact particles 50 with relatively weak electrical fields, thereby reducing power consumption of the display device 20.

Furthermore, seeing that the CV value of the outer diameters of the microcapsules 40 is small, the shape of each of the microcapsules 40 does not become flattened, but a spherical shape. This makes it possible for the contact particles 50 to reliably move along the inner surface of the capsule body 401 while maintaining the contact state when the contact particles 50 are moved. Therefore, it is possible to reliably display respective colors including the intermediate tone and exhibit high display contrast.

Seeing that the average value of the outer diameters of the microcapsules 40 falls within the above noted range, it is difficult for the microcapsule body 401 to deform. Further, relatively large amounts of the contact particles 50 and the dispersion particles 5 can be included in the capsule body 401. This makes it possible for the white particles to improve property of concealing the black particles when the white display. As a result, the white color is displayed clearly, thereby exhibiting high display contrast.

In a conventional display device operating with an electrophoresis method, when dispersibility of black particles and white particles contained in an electrophoretic dispersion liquid is improved, it is possible to rapidly switch (change) a display color to the other display color. However, in a display state, since the black particles and the white particles are moved with ease, it is impossible to maintain a display state of a predetermined color.

On the other hand, when the dispersibility of the black particles and the white particles contained in the electrophoretic dispersion liquid is lowered, in the display state, it is difficult that the black particles and the white particles are moved. Although this makes it possible to maintain the display state of the predetermined color for relatively a long period of time, it is impossible to rapidly switch (change) a display color to the other display color.

According to the display device of present invention, seeing that the contact particles 50 are moved along the inner surface of the capsule body 401 while maintaining the contact state, even if dispersability of the dispersion particles 5 contained in the dispersion liquid 10 is improved, it is possible to reliably maintain the display state of respective colors including the intermediate tone and rapidly switch the display color to the other display color.

This display device 20 is a so-called microcapsule type and therefore can be manufactured more easily and reliably than what is called a microcup type display device.

Second Embodiment

Hereinafter, a second embodiment will be described, with emphasis placed on the differing points from the first embodiment but with no description made on the same matters.

In a method of manufacturing a display device 20 of the second embodiment, the capsule body 401 is not electrically charged when forming the same. After the capsule body 401 has been formed in its entirety, namely after the microcapsule production step [A1] has been completed, a charging step for providing (existing) the net charges with the same polarity as that of the contact particles 50 inside the capsule body 401 through the binder is performed in the microcapsule coating material preparation step [A2].

In this case, a specified amount of positive or negative charging agent may be added to the binder 41 depending on the polarity of the contact particles 50. This makes it possible to adjust the charge amount and the charge density of the capsule body 401 while providing the net charges with the same polarity as that of the contact particles 50 inside the capsule body 401. In this regard, it is to be noted that the binder 41 may be or may not be electrically charged.

The display device 20 thus constructed can exercise the same advantageous effects as those of the display device 20 of the first embodiment.

Third Embodiment

Hereinafter, a third embodiment will be described, with emphasis placed on the differing points from the first embodiment but with no description made on the same matters.

Figure 16A:
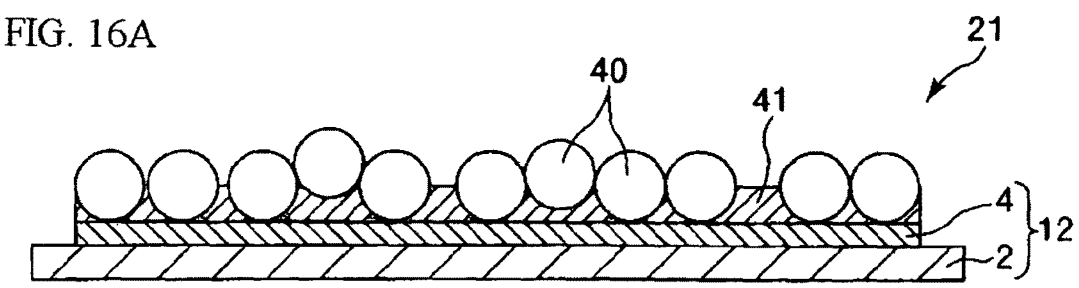
FIGS. 16A and 16B are pattern diagrams for explaining another method of manufacturing the display device shown in FIG. 1.
Figure 16B:
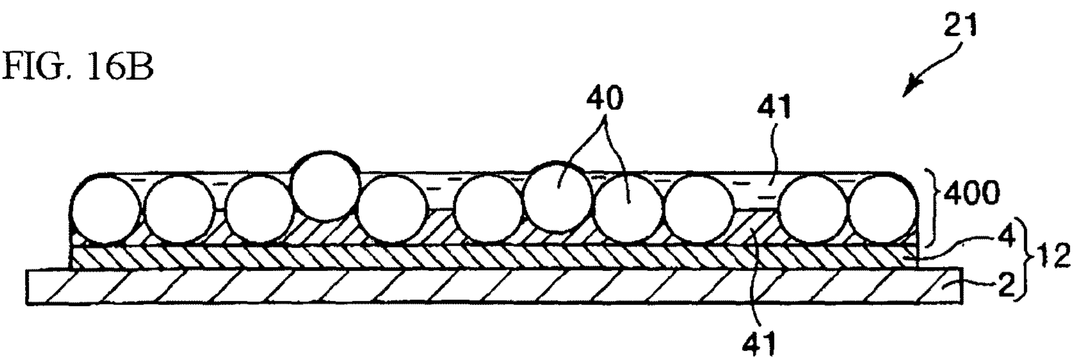

FIGS. 16A and 16B are pattern diagrams for explaining another method of manufacturing the display device shown in FIG. 1. In the following description, the upper side in FIGS. 16A and 16B will be referred to as "upper" with the lower side as "lower", for the purpose of convenience in the description.

The third embodiment is the same as the first embodiment except that a microcapsule-containing layer 400 formation step (A3) is different from that of the first embodiment.

A microcapsule coating material in which an amount (amount ratio) of a binder 41 is relatively low is used in the microcapsule-containing layer 400 formation step (A3) of the third embodiment. To be concrete, the amount of the binder 41 contained in the microcapsule coating material is preferably in the range of about 20 to 30 vol % with respect to a total amount of the microcapsules 40 and the binder 41.

If the amount of the binder 41 contained in the microcapsule coating material is too much, the microcapsule coating material can not be applied onto the base substrate so that the microcapsules 40 are densely arranged. In addition, an extra binder 41 enters into gaps between the microcapsules 40 and the second electrode 4 or the adhesive agent layer 8 (first electrodes 3). Furthermore, the microcapsules 40 are arranged so as to overlap to each other with ease.

In this embodiment, first, by using the microcapsule coating material in which the amount of the binder 41 is relatively low, the microcapsule coating material is applied onto the base substrate 12 as shown in FIG. 16A, the applied microcapsule coating material is dried, and then a smoothing treatment is carried out to the dried microcapsule coating material.

This makes it possible to apply the microcapsule coating material onto the base substrate 12 so that the microcapsules 40 are densely arranged. In addition, the microcapsules 40 can be in contact with (adhere to) the second electrode 4 or the adhesive agent layer 8 (first electrodes 3). Furthermore, the microcapsules 40 can be arranged in a single layer manner.

Since the amount of the binder 41 contained in the microcapsule coating material is relatively low, the entire microcapsules 40 can not be covered with the binder 41. In FIG. 16A, the lower portions of the microcapsules 40 are covered with the binder 41.

Next, as shown in FIG. 16B, a binder liquid obtained by mixing the binder 41 and a solvent is further applied onto the microcapsules 40, thereby providing a remaining amount of the binder 41 to be used as the microcapsule-containing layer 400. This makes it possible to cover the entire microcapsules 40 with the binder 41. The following steps will be omitted from the description because the following steps are the same as those of the first embodiment.

The display device 20 thus constructed can exercise the same advantageous effects as those of the display device 20 of the first embodiment.

Fourth Embodiment

Figure 17:
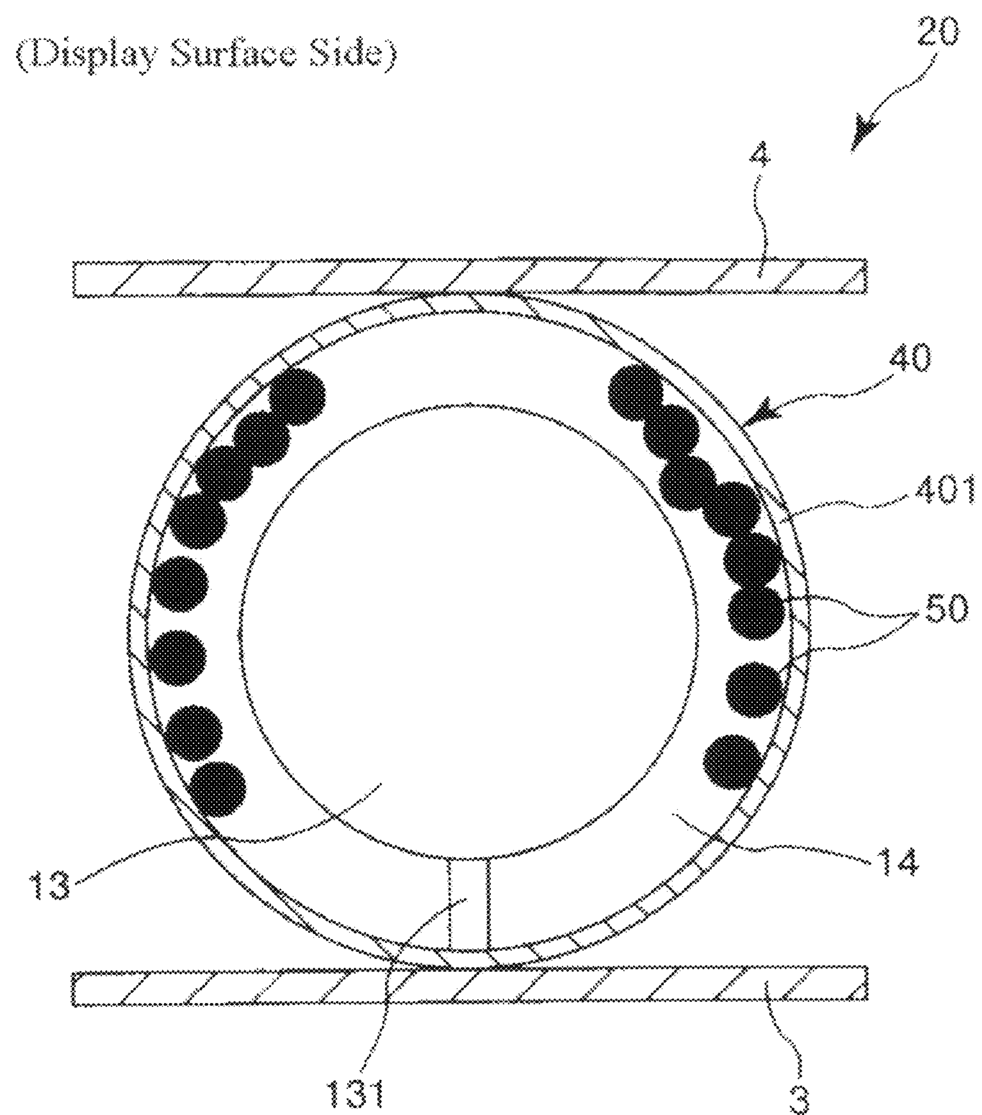
FIG. 17 is a vertical section view schematically showing a fourth embodiment of a display device according to the present invention.

FIG. 17 is a vertical section view schematically showing a fourth embodiment of a display device according to the present invention. In the following description, the upper side in FIG. 17 will be referred to as "upper" with the lower side as "lower", for the purpose of convenience in description. In FIG. 17, the microcapsule 40 is drawn in a single layer manner for easy description.

Hereinafter, the fourth embodiment will be described, with emphasis placed on the differing points from the first embodiment but with no description made on the same matters.

In a display device 20 of the fourth embodiment, microcapsule 40 includes a structural body 13 which is provided in the microcapsule 40 so as to be spaced apart from the inner surface of the capsule body 401 to a predetermined distance as a scattering body or a colored particles.

In this embodiment, an external form of the structural body 13 is a similar figure to the shape of the capsule body 401. The structural body 13 is fixed to a predetermined portion of the capsule body 401, (e.g. in FIG. 17, an opposite portion of the capsule body 401 to the display surface, that is a lower portion of the capsule body 401), by a supporting portion 131.

The contact particles 50 are positioned in a space (gap space) 14 between an outer surface of the structural body 13 and the inner surface of the capsule body 401. The contact particles 50 are moved along the inner surface of the capsule body 401 while maintaining the contact state.

In this regard, it is to be noted that the supporting portion 131 is in a shape of a small rod, does not prevent the movement of the contact particles 50.

The structural body 13 is not particularly limited to a specific body as long as it has a function of scattering light or a different hue from that of contact particles 50. Examples of such a structural body 13 include: one in which at least one of particles (powder), a liquid, and a gas are encapsulated in a shell (shell); a solid body (bulk body); and the like.

In this regard, it is to be noted that a gas such as air may be filled into the space 14. Further, the space may be in a state of a near vacuum (substantially vacuum).

The display device 20 thus constructed can exercise the same advantageous effects as those of the display device 20 of the first embodiment.

Electronic Apparatus

The display device 20 described above can be used for constituting a variety of electronic apparatuses. Hereinafter, a description will be made on examples of an electronic apparatus of the present invention provided with the display device 20.

Electronic Paper

First, a description will be offered regarding an embodiment in which the electronic apparatus of the present invention is used in an electronic paper.

Figure 18:
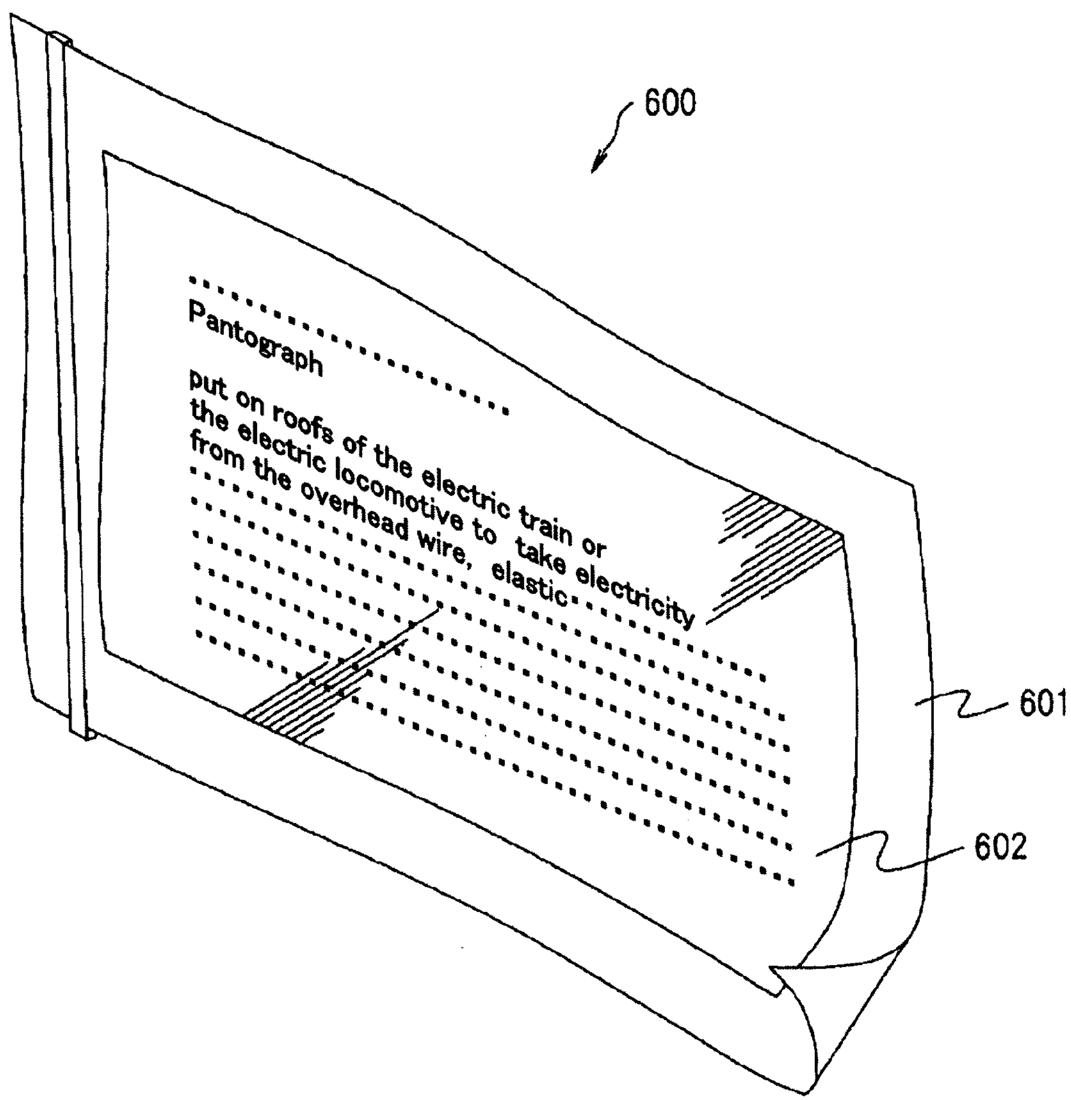
FIG. 18 is a perspective view showing an embodiment in which an electronic apparatus according to the present invention is used in an electronic paper.

FIG. 18 is a perspective view showing an embodiment in which the electronic apparatus according to the present invention is used in an electronic paper.

The electronic paper 600 shown in FIG. 18 includes a main body 601 formed of a rewritable sheet having the same texture and flexibility as that of a paper sheet, and a display unit 602 attached to the main body 601. In the electronic paper 600, the display unit 602 is formed from the display device 20 described above.

Display Apparatus

Next, a description will be offered regarding an embodiment in which the electronic apparatus of the present invention is used in a display apparatus.

Figure 19A:
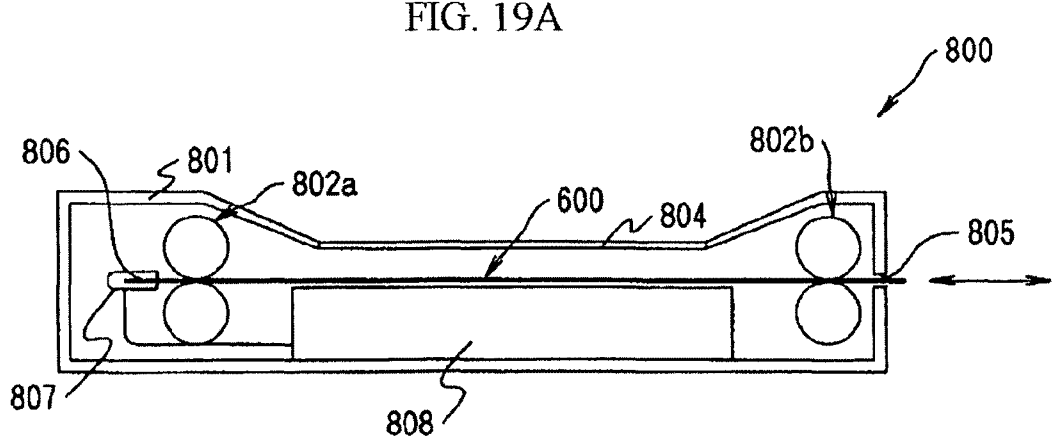
FIGS. 19A and 19B are section and plan views showing an embodiment in which an electronic apparatus according to the present invention is used in a display apparatus.
Figure 19B:
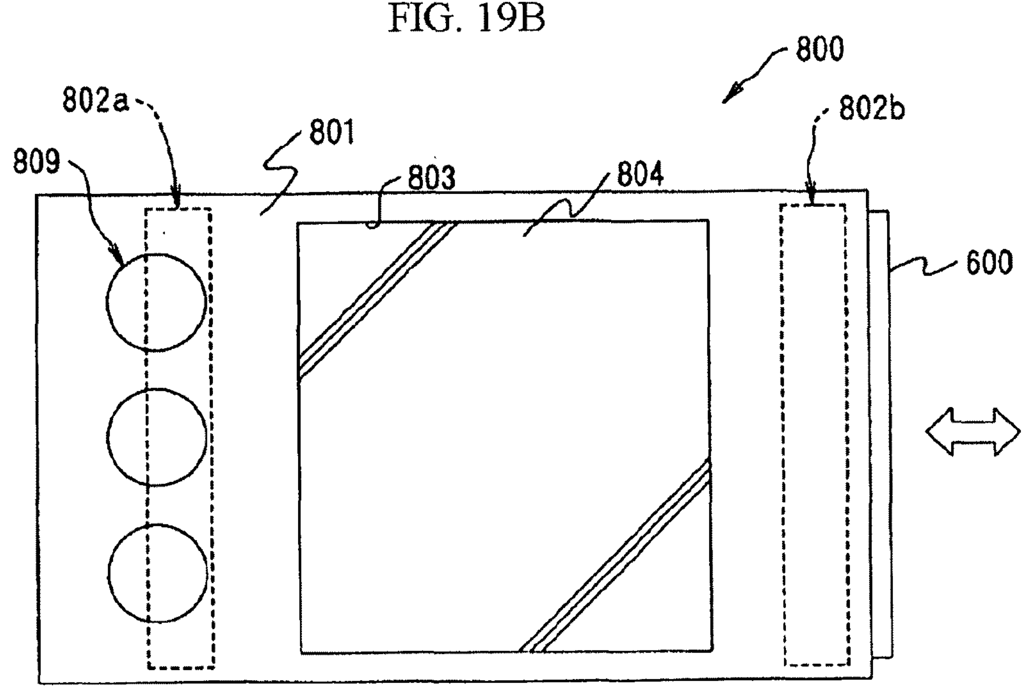

FIGS. 19A and 19B are section and plan views showing an embodiment in which the electronic apparatus according to the present invention is used in a display apparatus.

The display apparatus 800 shown in FIGS. 19A and 19B includes a main body portion 801 and an electronic paper 600 detachably attached to the main body portion 801. The electronic paper 600 is of the same configuration as set forth above, i.e., the same configuration as shown in FIG. 18.

Formed on one lateral side (the right side in FIG. 19A) of the main body portion 801 is an insertion slot 805 through which the electronic paper 600 can be inserted. Two pairs of conveying rollers 802*a* and 802*b* are provided within the main body portion 801.

When the electronic paper 600 is inserted into the main body portion 801 through the insertion slot 805, the electronic paper 600 is held within the main body portion 801 in a state that it is gripped by means of the pairs of conveying rollers 802*a* and 802*b*.

A rectangular opening 803 is formed on a display surface side (the front side in FIG. 19B) of the main body portion 801 and a transparent glass plate 804 is fitted to the rectangular opening 803. This allows the electronic paper 600 held within the main body portion 801 to be visually recognized from the outside of the main body portion 801.

In other words, the display apparatus 800 has a display surface that allows the electronic paper 600 held within the main body portion 801 to be visually recognized through the transparent glass plate 804.

A terminal portion 806 is formed in a leading edge portion (the left side in FIGS. 19A and 19B) of the electronic paper 600. Provided within the main body portion 801 is a socket 807 that makes contact with the terminal portion 806 when the electronic paper 600 is placed within the main body portion 801. A controller 808 and an operation part 809 are electrically connected to the socket 807.

In the display apparatus 800 set forth above, the electronic paper 600 is removably fitted to the main body portion 801 and is portable in a state that it is removed from the main body portion 801.

Furthermore, the electronic paper 600 of the display apparatus 800 is formed from the display device 20 described above.

In this regard, it is to be noted that the electronic apparatus of the present invention is not limited to the uses as described above. Examples of other uses of the electronic apparatus include a television set, a viewfinder type or monitor viewing type video tape recorder, a car navigation system, a pager, a personal digital assistance, an electronic calculator, an electronic newspaper, a word processor, a personal computer, a workstation, a picture phone, a POS terminal, a device provided with a touch panel and the like. The display device 20 of the present invention can be used in display parts of the various kinds of electronic apparatuses described above.

While the present invention has been described hereinabove based on the illustrated embodiments, the present invention is not limited thereto. The construction of each part may be replaced by an arbitrary construction having the same function.

Furthermore, other arbitrary constituents or steps may be added to the present invention. In addition, the present invention may be embodied by combining two or more arbitrary constituents (features) of the respective embodiments described above.

While a pair of electrodes is provided in a mutually facing relationship in the foregoing embodiments, the present invention is not limited thereto, but may be applied to, e.g., a construction in which a pair of electrodes is provided on the same substrate.

While a pair of substrates is provided in a mutually facing relationship in the foregoing embodiments, the present invention is not limited thereto, but may be applied to, e.g., a construction having a single substrate.

While the microcapsules are arranged so as not to straddle the neighboring pixel electrodes in the foregoing embodiments, the present invention is not limited thereto. Alternatively, the microcapsules may be arranged to straddle, e.g., two neighboring pixel electrodes or three or more neighboring pixel electrodes. Such arrangement patterns may be used in combination.

EXAMPLES

Next, a description will be made on concrete examples according to the present invention.

1. Manufacture of Display Device

A dispersion liquid according to the following synthesis example 1 was produced as follows.

Synthesis Example 1

A separable flask of 300 ml volume having a rotor blade, a thermometer, and a cooling pipe was prepared. Further, copolymer (MW: 5300) constituted of dodecyl methacrylate and 2-ethylhexyl acrylate (of which ratio was 85:15) was also prepared. Furthermore, a positively-charged carbon black (of which charge amount was +85 μc/g) (manufactured by Evonik Degussa GmbH under the trade name of "Printex 60") was also prepared as contact particles (black particles).

Next, the copolymer of 2 g, the positively-charged carbon black of 20 g, and Isoper M of 78 g were added in the separable flask. Beads of 800 g, which had 1 mmΦ (diameter) and were made of zirconia, were further added in the separable flask to obtain a first mixture. The first mixture was mixed at an agitating speed of 300 rpm at a temperature of 60° C. for 2 hours to disperse the positively-charged carbon black (contact particles). In this regard it is to be noted that a method of measuring a charge amount of the contact particles will be described later.

Next, Isoper M of 100 g was added in the separable flask to obtain a second mixture, and then the second mixture was mixed. Thereafter, the beads were separated from the second mixture to obtain a carbon black dispersion liquid containing the carbon black of 10 wt %.

On the other hand, a separable flask of 300 ml volume having a rotor blade was prepared. Further, copolymer (MW: 6800) constituted of dodecyl methacrylate and 2-ethylhexyl acrylate, and methacryloxy propyl trimethoxy silane (of which ratio was 80:15:5) was also prepared. Furthermore, negatively-charged titanium oxide (of which charge amount was −36 μc/g) (manufactured by ISHIHARA SANGYO KAISHYA, LTD. under the trade name of "TIPAQUE PC-3") was also prepared as dispersion particles (particles for scattering light).

Next, the copolymer of 5 g, the negatively-charged titanium oxide of 50 g, and hexane of 100 g were added into the separable flask to obtain a third mixture. Then, the separable flask was set in an ultrasonic wave bath (manufactured by Yamato Scientific Co., Ltd. under the trade name of "BRANSON 5210") at a temperature 55° C. In such a sate, the third mixture was mixed for 2 hours while applying an ultrasonic wave thereto.

Next, the separable flask was moved (set) from the ultrasonic wave bath to a warming bath. A solvent (hexane) was removed from the third mixture to obtain titanium oxide in a powder form. Then, the titanium oxide was taken out from the separable flask, and then added in a vat. Thereafter, the titanium oxide was subject to a heat treatment under a temperature of 150° C. for 5 hours.

The titanium oxide was dispersed in hexane of 100 g, and then was centrifuged by a centrifugal settler. After the centrifuged titanium oxide was washed three times, the washed titanium oxide was dried at a temperature of 100° C.

The thus obtained titanium oxide of 50 g and Isoper M of 50 g were added into a flask to obtain a fourth mixture, and then the flask was set in the ultrasonic wave bath (manufactured by Yamato Scientific Co., Ltd. under the trade name of "BRANSON 5210") at a temperature 55° C. In such a sate, the fourth mixture was mixed for 2 hours while applying the ultrasonic wave thereto. In this way, a titanium oxide dispersion liquid containing the thus obtained titanium oxide of 50 wt % was obtained.

The carbon black dispersion liquid of 6.0 g, the titanium oxide dispersion liquid of 75 g, and Isoper M of 15 g were added into a mayonnaise bin of 200 ml volume to obtain a fifth mixture. The fifth mixture was mixed to obtain a dispersion liquid containing a positively-charged carbon black and a negatively-charged titanium oxide.

A display device was manufactured by using the dispersion liquid thus obtained in the Synthesis Example 1 in each of the Examples 1 to 25 and the Comparative Examples 1 to 12.

Example 1

An aqueous solution of 120 g in which polyvinylalcohol of 6 g (manufactured by KURARAY CO., LTD. under the trade name of "KURARAY POVAL 205") was dissolved was added into a separable flask having a flat bottom and 500 ml volume. Next, methyl methacrylate of 10 g, glycidyl methacrylate of 2 g, tetraethyleneglycol diacrylate of 1 g, and azo-bisisobutyronitrile of 0.15 g were dissolved in the dispersion liquid containing the positively-charged carbon black and the negatively-charged titanium oxide obtained in the Synthesis Example 1 to obtain a dispersion mixture.

Then, the dispersion mixture was added into the aqueous solution in the separable flask while stirring it by a disper (manufactured by PRIMIX Corporation under the trade name of "ROBOMICS") to obtain a sixth mixture. Thereafter, the sixth mixture was stirred at an agitating speed of 2000 rpm for 2 minutes, and then the agitating speed was changed from 2000 rpm to 1700 rpm. Then, water of 200 g was added into the sixth mixture to obtain a suspension.

The suspension was added into a fourth-neck separable flask having a thermometer and a cooling pipe. Then, a nitrogen gas was flowed (filled) into the fourth-neck separable flask. In such a state, the suspension was reacted at a temperature of 70° C. for 5 hours. Thereafter, a first capsule layer constituted of the acryl-based resin was formed in the suspension, and then pre-microcapsules encapsulating the dispersion liquid and the contact particles (carbon black) were obtained in the suspension.

The thus obtained pre-microcapsules were cooled by a temperature of 25° C. Thereafter, coarse particles of the pre-microcapsules were removed by a standard sieve "a" having a sieve pore size of 32 μm.

A capsule dispersion liquid (suspension) of 1000 ml in which the pre-microcapsules were dispersed was added into a beaker of 2 L volume. The beaker was left to allow the pre-microcapsules to settle down in the capsule dispersion liquid. Thereafter, the washing, the settling, and the classifying operations were repeatedly carried out. These operations (a set of the washing, the settling, and the classifying operations) were repeated three times to wash the pre-microcapsules.

Next, all the pre-microcapsules were added into a separable flask having a flat bottom and 500 ml volume, and deionized water was further added into the separable flask to set a total amount thereof to 200 g to obtain a seventh mixture. A temperature of the seventh mixture was elevated by 50° C. while stirring it.

Next, a solution of 100 g in which polyglycerol polyglycidyl ether of 15 g, which is an epoxy compound (manufactured by Nagase ChemteX Corporation under the trade name of "DENACOL EX521"), was dissolved was added into the seventh mixture. After 30 minutes, a 5 wt % polyallylamine (of which weight-average molecular weight was 1000, and which manufactured by Nitto Boseki Co., Ltd. under the trade name of "Polyallylamine PAA-01") solution of 50 g as a cross-linking agent was added into the seventh mixture drop by drop for 5 minutes.

A reaction was carried out at a temperature of 50° C. for 5 hours to precipitate a charge applying shell on the surface of each of the pre-microcapsules (first capsule layer) and to thereby form a second capsule layer constituted of an epoxy-based resin. In this way, microcapsules were obtained. In each of the microcapsules, the dispersion liquid and the contact particles (carbon black) were encapsulated in the capsule body which was constituted from the first and second capsule layers.

In the second capsule layer formation step, it was determined that a color of the second capsule layer was gradually changed to a black color. In this regard, it is to be noted that the contact particles included in the microcapsules were positively charged, the dispersion particles included in the microcapsules were negatively charged, and the capsule body was negatively charged.

Next, the thus obtained microcapsules were cooled by a temperature of 25° C. as the pre-microcapsules described above. Then, coarse particles of the microcapsules were removed by a standard sieve "a" having a sieve pore size of 32 μm. Thereafter, the microcapsules were washed, and then fine particles of the microcapsules were removed by a standard sieve "b" having a sieve pore size of 16 μm.

In other words, the microcapsules through the standard sieve "a" having the sieve pore size of 32 μm and not through the standard sieve "b" having the sieve pore size of 16 μm were collected. The black color of the microcapsules was maintained even after washing thereof.

A ratio of a solid portion included in a paste containing the thus obtained microcapsules was 65 wt %. This was defined as a microcapsule paste (1).

Next, a solid matter constituted of butyl acrylate, 2-ethylhexyl acrylate, methyl methacrylate, and hydroxyethyl methacrylate (of which ratio was 45:45:9:1) was prepared. Then, an emulsion of 13 g in which an amount of the solid matter was 50 wt % and water of 10 g were added into the microcapsule paste (1) of 30 g to obtain a eighth mixture. The eighth mixture was mixed by a mixer (manufactured by THINKY Corporation under the trade name of "THINKY Mixer AR-100") for 10 minutes to obtain a microcapsule coating material.

Next, the microcapsule coating material was applied onto second electrode, which was constituted of ITO, formed on a base substrate by using an applicator. Thereafter, the applied microcapsule coating material was dried at a temperature of 90° C. for 10 minutes to form a microcapsule-containing layer. In this way, a display sheet (1) was obtained.

In this regard, it is to be noted that the microcapsule-containing layer was not formed on the entire surface of the second electrode, that is, there were a part (conductive part) in which the microcapsule-containing layer was not formed on the surface of the second electrode.

Next, a display device was manufactured by using the display sheet (1) as follows. In the thus obtained display sheet (1), the conductive part was formed on the surface of the second electrode in a parallel state to one side thereof. The microcapsule-containing layer was formed on the surface of the second electrode except for the surface on which the conductive part was formed.

That is, the microcapsule-containing layer was formed in a size of 5 cm long and 3 cm short in a planner view. Such a display sheet (1) was used for manufacturing the display device.

A circuit board in which a first electrodes constituted of ITO were formed on a base substrate was prepared. The circuit board was formed in a size 6 cm long and 4 cm short in a planner view and a thickness of 75 μm. Such a display sheet (1) and such a circuit board were bonded together through an adhesive agent layer to obtain a laminate body.

At this time, arbitrary two parts of the display sheet (1) and the circuit board were sealed with Sellotape (registered trademark). Thereafter, the laminate body was put on a glass board having a thickness of 2 mm, and then passed through between two rolls of a roll laminater to bond the display sheet (1) and the circuit board together.

The two rolls of the roll lamineter were made of a silicon rubber. A diameter of each of two rolls was 3 inch, and a clearance between the two rolls was 0 mm. One roll (upper roll) of the two rolls was heated by a heat medium, and a temperature of the surface of the one roll was 120° C. The one roll was rotated by driving, and a position of the one roll was fixed.

On the other hand, the other roll (lower roll) was not heated, and rotated freely. The other roll was compressed to the one roll with an air pressure of 0.2 mPa.

The laminate body was arranged on the glass board so that the microcapsule-containing layer included in the display sheet (1) was opposite to the one roll (upper roll). A feeding rate of the laminate body was 6 cm/min.

Examples 2 to 25 and Comparative Examples 1 to 12

In each of the Examples 2 to 25 and the Comparative Examples 1 to 12, a display device was manufactured in the same manner as in the Example 1 except that the particles size (outer diameter) of each of the microcapsules was adjusted by using standard sieves "a" and "b" as shown in Table 1.

In other words, in each of the Examples 2 to 25 and the Comparative Examples 1 to 12, when a microcapsule coating material was produced, microcapsules through the standard sieve "a" shown in Table 1 and not through the standard sieve "b" shown in Table 1 were collected. Then, the collected microcapsules were used for manufacturing of the display device.

TABLE 1

| | Standard Sieve "a" | Standard Sieve "b" |
|---|---|---|
| Comp. Ex. 1 | 16 μm | — |
| Comp. Ex. 2 | 26 μm | 16 μm |
| Ex. 1 | 32 μm | 16 μm |
| Ex. 2 | 38 μm | 20 μm |
| Ex. 3 | 38 μm | 20 μm |
| Ex. 4 | 45 μm | 26 μm |
| Ex. 5 | 53 μm | 32 μm |
| Ex. 6 | 53 μm | 32 μm |
| Ex. 7 | 63 μm | 38 μm |
| Ex. 8 | 75 μm | 45 μm |
| Comp. Ex. 3 | 90 μm | 53 μm |
| Comp. Ex. 4 | 100 μm | 63 μm |
| Comp. Ex. 5 | 16 μm | — |
| Comp. Ex. 6 | 20 μm | 16 μm |
| Ex. 9 | 26 μm | 20 μm |
| Ex. 10 | 32 μm | 26 μm |
| Ex. 11 | 32 μm | 26 μm |
| Ex. 12 | 38 μm | 32 μm |
| Ex. 13 | 45 μm | 38 μm |
| Ex. 14 | 45 μm | 38 μm |
| Ex. 15 | 53 μm | 45 μm |
| Ex. 16 | 63 μm | 53 μm |
| Comp. Ex. 7 | 75 μm | 63 μm |
| Comp. Ex. 8 | 90 μm | 75 μm |
| Ex. 17 | 45 μm | 38 μm |
| Ex. 18 | 45 μm | 38 μm |
| Ex. 19 | 45 μm | 32 μm |
| Ex. 20 | 45 μm | 32 μm |
| Ex. 21 | 53 μm | 32 μm |
| Ex. 22 | 53 μm | 32 μm |
| Comp. Ex. 9 | 53 μm | 26 μm |
| Comp. Ex. 10 | 53 μm | 20 μm |
| Comp. Ex. 11 | 60 μm | 20 μm |
| Ex. 23 | 38 μm | 26 μm |
| Ex. 24 | 53 μm | 38 μm |
| Ex. 25 | 63 μm | 45 μm |
| Comp. Ex. 12 | 75 μm | 53 μm |

2. Measurement of Charge Amount of Particles (Contact Particles and Dispersion Particles)

Iron powder (manufactured by DOWA IP CREATION CO., LTD. under the trade name of "DSP-128") of 20 g and the contact particles of 0.4 g were added into a vessel of 50 ml volume which was made of polypropyrene, and then mixed for 5 minutes at an agitating number of 100 rpm by using a ball mill to obtain a mix powder.

A charge amount of the mix powder was measured by a blow-off type apparatus for measuring charge amounts of powder (manufactured by TOSHIBA CHEMICAL CORPORATION under the trade name of "MODEL TB-200"). The result has been shown in Synthesis Example 1 described above. That is, the charge amount was +85 μc/g.

Furthermore, a charge amount of a mix powder including the dispersion particles and iron powder was also measured in the same manner as the mix powder including the iron powder and the contact particle. The result has been shown in Synthesis Example 1 described above. That is, the charge amount was −36 μc/g.

3. Measurement of CV Value

In each of the Examples 1 to 25 and the Comparative Examples 1 to 12, an average value (average capsule diameter) of outer diameters of the microcapsules and a standard deviation of the outer diameters of the microcapsules were measured and calculated by using a particle size distribution measurement apparatus (manufactured by Beckman Coulter, Inc. under the trade name of "Mdtisizer 3 type system") and image processed micrographs.

Then, a CV value (%) of the outer diameters of the microcapsules was calculated by using the average capsule diameter and the standard deviation. That is, the CV value was calculated the following formula: CV value (%)=standard deviation/average capsule diameter×100. The results were shown in Table 2.

4. Evaluation

In the display device obtained in each of the Examples 1 to 25 and the Comparative Examples 1 to 12, a pulse voltage of 15 V and 400 millisecond was applied to between the first electrodes and the second electrode to display a black color. A brightness of the black color was measured by a reflection density meter (manufactured by X-Rite Incorporated. under the trade name of "SpectroEye").

Next, a polarity of the applied voltage was switched reversely, and then a pulse voltage of 15 V and 400 millisecond was applied to between the first electrodes and the second electrode to display a white color. A brightness of the white color was measured by the reflection density meter. Thereafter, display contrast was obtained (calculated) by using the brightnesses of the black color and the white color. The results were shown in Table 2.

TABLE 2

| | Average Capsule Diameter (μm) | Standard Deviation (μm) | CV Value (%) | White Color (%) | Black Color (%) | Display Contrast |
|---|---|---|---|---|---|---|
| Comp. Ex. 1 | 14 | 2.6 | 18.6 | 31 | 8 | 3.9 |
| Comp. Ex. 2 | 18 | 3.4 | 18.9 | 33 | 7 | 4.7 |
| Ex. 1 | 22 | 4.3 | 19.5 | 33 | 5.9 | 5.6 |
| Ex. 2 | 28 | 5.5 | 19.6 | 37 | 5.8 | 6.4 |
| Ex. 3 | 31 | 6 | 19.4 | 37.5 | 5.3 | 7.1 |
| Ex. 4 | 36 | 7.2 | 20.0 | 38.6 | 5 | 7.7 |
| Ex. 5 | 40 | 7.6 | 19.0 | 41.3 | 4.8 | 8.6 |
| Ex. 6 | 42 | 8.8 | 19.6 | 39 | 4.7 | 8.3 |
| Ex. 7 | 51 | 9.7 | 19.0 | 37.5 | 5.4 | 6.9 |
| Ex. 8 | 60 | 11.2 | 18.7 | 36 | 6.8 | 5.3 |
| Comp. Ex. 3 | 70 | 13.6 | 19.4 | 31 | 8 | 3.9 |
| Comp. Ex. 4 | 80 | 15.4 | 19.3 | 26 | 10 | 2.6 |
| Comp. Ex. 5 | 15 | 1.3 | 8.7 | 32 | 7.5 | 4.3 |
| Comp. Ex. 6 | 18 | 1.6 | 8.9 | 33 | 6.8 | 4.9 |
| Ex. 9 | 23 | 2.1 | 9.1 | 37.6 | 5.3 | 7.1 |
| Ex. 10 | 28.5 | 2.8 | 9.8 | 41 | 4.9 | 8.4 |
| Ex. 11 | 30 | 2.8 | 9.3 | 44.5 | 4.6 | 9.7 |
| Ex. 12 | 35 | 3.5 | 10.0 | 46.8 | 4.6 | 10.2 |
| Ex. 13 | 41 | 3.6 | 8.8 | 47 | 4.2 | 11.2 |
| Ex. 14 | 43 | 3.8 | 8.3 | 43 | 4.4 | 9.8 |
| Ex. 15 | 50 | 4.4 | 8.8 | 44 | 5.3 | 8.3 |
| Ex. 16 | 59 | 5.6 | 9.5 | 43 | 5.8 | 7.4 |
| Comp. Ex. 7 | 72 | 6.3 | 8.8 | 38 | 8 | 4.8 |
| Comp. Ex. 8 | 81 | 8 | 9.9 | 35 | 9 | 3.9 |
| Ex. 17 | 43 | 3 | 7.0 | 46 | 3.9 | 11.8 |
| Ex. 18 | 41 | 3.5 | 8.5 | 47.5 | 4.1 | 11.6 |
| Ex. 19 | 42 | 5 | 11.9 | 45 | 4.3 | 10.5 |
| Ex. 20 | 39 | 6 | 15.4 | 43 | 4.3 | 10.0 |
| Ex. 21 | 40 | 7 | 17.5 | 42 | 5 | 8.4 |
| Ex. 22 | 38 | 7 | 18.4 | 39 | 5.3 | 7.4 |
| Comp. Ex. 9 | 42 | 9.8 | 23.3 | 31 | 6.2 | 5.0 |
| Comp. Ex. 10 | 41 | 11.8 | 28.8 | 30 | 6.7 | 4.5 |
| Comp. Ex. 11 | 39 | 13 | 33.3 | 28 | 8 | 3.5 |
| Ex. 23 | 31 | 4.7 | 15.2 | 40 | 4.8 | 8.3 |
| Ex. 24 | 45 | 7 | 15.6 | 43 | 4.6 | 9.3 |

TABLE 2-continued

| | Average Capsule Diameter (μm) | Standard Deviation (μm) | CV Value (%) | White Color (%) | Black Color (%) | Display Contrast |
|---|---|---|---|---|---|---|
| Ex. 25 | 50 | 7.2 | 14.4 | 42 | 5.6 | 7.5 |
| Comp. Ex. 12 | 65 | 9.9 | 15.2 | 34 | 6.7 | 5.1 |

As shown in Table 2, the display contrast was high in the display device obtained in each of the Examples 1 to 25. In contrast, the display contrast was low in the display device obtained in each of the Comparative Examples 1 to 12.

Figure 20:
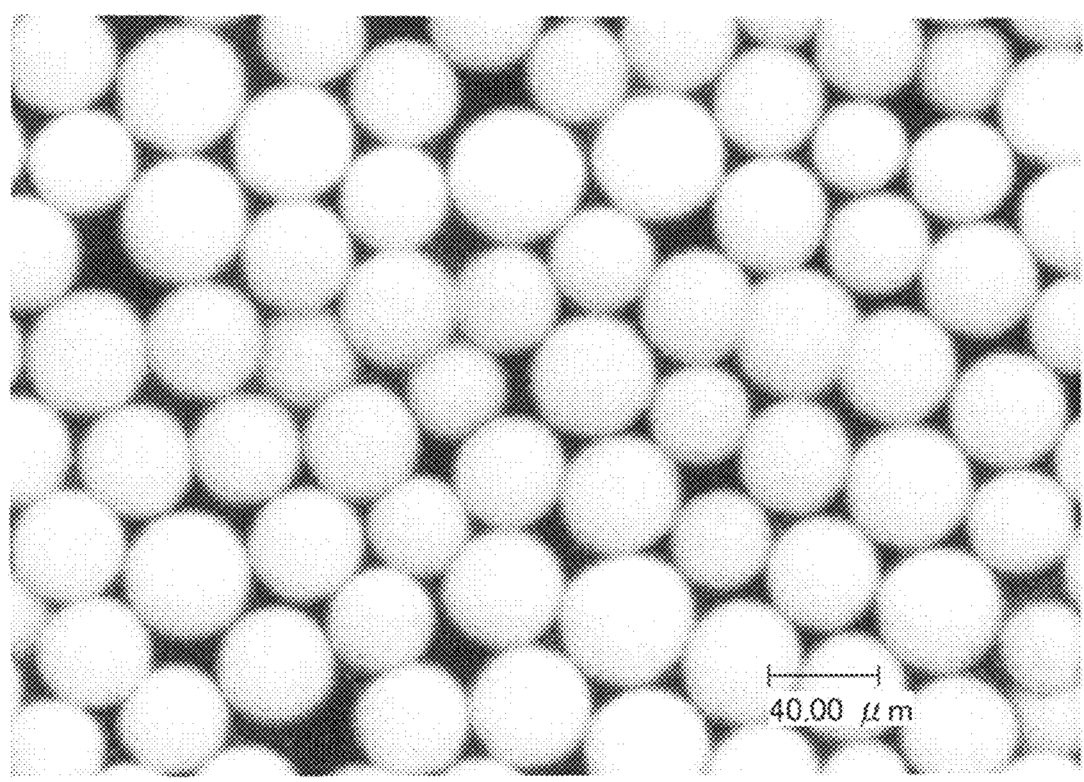
FIG. 20 is an electron microscope photograph of microcapsules when a white color is displayed after a black color is displayed in a display device obtained in Example 23.
Figure 21:
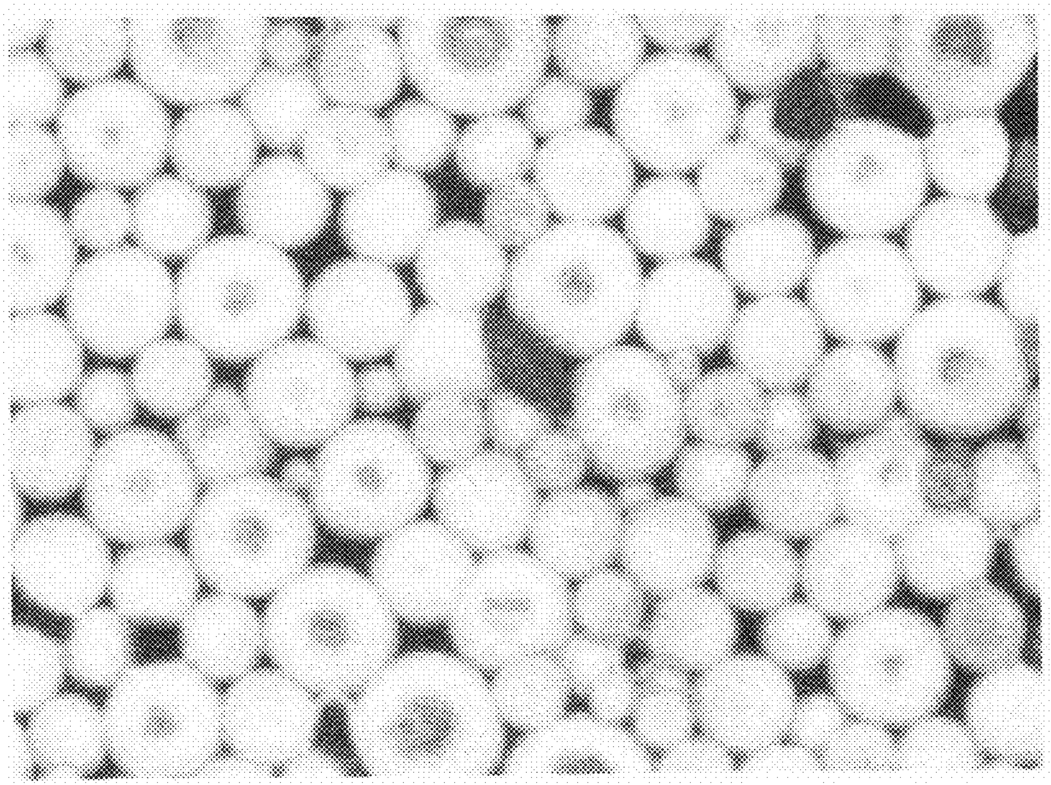
FIG. 21 is an electron microscope photograph of microcapsules when a white color is displayed after a black color is displayed in a display device obtained in Comparative Example 10.

FIG. 20 is an electron microscope photograph of microcapsules when a white color is displayed after a black color is displayed in the display device obtained in Example 23. FIG. 21 is an electron microscope photograph of microcapsules when a white color is displayed after a black color is displayed in the display device obtained in Comparative Example 10.

As shown in FIG. 20, in the microcapsules of the display device obtained in the Example 23, colors of all of the microcapsules were a white color without that parts of the surfaces of the microcapsules became a black color. In contrast, as shown in FIG. 21, in the microcapsules of the display device obtained in the Comparative Example 10, parts of the surfaces of the microcapsules were the black color. That is, all of the microcapsules were not the white color.

What is claimed is:

1. A display device comprising:

a microcapsule-containing layer including a plurality of microcapsules each having an outer diameter, wherein a variation of the outer diameters of the plurality of microcapsules can be defined by an average value and a CV value, and wherein each of the plurality of microcapsules comprised of:

a shell having an inner surface;

contact particles electrically charged and provided within the shell in an contact state that the contact particles are in contact with the inner surface of the shell, and the contact particles having a hue; and a scattering body for scattering light, and the scattering body provided within the shell; or a colored particles having a different hue from the hue of the contact particles, and the colored particles provided within the shell; and a pair of electrodes that when an electrical voltage is applied to between the pair of electrodes, electrical fields to act on the contact particles are generated;

wherein the average value of the outer diameters of the plurality of microcapsules is in the range of 20 to 60 μm, and the CV value of the outer diameters of the microcapsules is 20% or less, and wherein in a case where the electrical voltage is applied to between the pair of electrodes, the contact particles are moved along the inner surface of the shell while maintaining the contact state with the inner surface of the shell.

2. The display device as claimed in claim 1, wherein the contact particles are in contact with the inner surface of the shell due to an electrostatic force exerted therebetween.

3. The display device as claimed in claim 1, wherein the contact particles have a polarity, the microcapsules have net charges having the same polarity as the polarity of the contact particles, and the net charges are existed within the shell, so that the contact particles are in contact with the inner surface of the shell due to the same polarity of the net charges.

4. The display device as claimed in claim 1, wherein a force of holding the contact particles against the inner surface of the shell is greater than an electrostatic force of acting on the contact particles due to the electrical fields generated between the pair of electrodes.

5. The display device as claimed in claim 1, wherein the scattering body or the colored particles is/are a structural body provided within the shell so as to be spaced apart from the inner surface of the shell to a predetermined distance, and the structural body having an outer surface, wherein the contact particles are positioned between the inner surface of the shell and the outer surface of the structural body.

6. The display device as claimed in claim 1, wherein the display device has a side surface, and an average roundness R of the microcapsules represented by the following formula (I) is in the range 0.88 to 1 when viewed from the side surface of the display device, wherein $R=L_0/L_1$ (I), and wherein $L_1$ (μm) represents a circumference of a projected image of the microcapsule that is a subject of measurement, and $L_0$ (μm) represents a circumference of a perfect circle having the same area as that of the projected image of the microcapsule that is the subject of measurement.

7. The display device as claimed in claim 1, wherein the shell comprises a first layer and a second layer arranged outside the first layer, and each of the first layer and the second layer has a shell-like shape.

8. The display device as claimed in claim 1, wherein the display surface has a display surface, positions of the contact particles included in the microcapsules are adjusted by adjusting of a magnitude of the electrical voltage to be applied to between the pair of electrodes and/or a time of applying the electrical voltage to between the pair of electrodes, so that when the display device is viewed from the display surface, a ratio of an area of a region in which the contact particles provided within the shell are viewed and an area of a region in which the scattering body or the colored particles provided within the shell is/are viewed is adjustable.

9. An electronic apparatus provided with the display device defined by claim 1.

10. The display device as claimed in claim 1, wherein the scattering body or the colored particles comprise a liquid filled in the shell.

11. The display device as claimed in claim 10, wherein the liquid is constituted of a liquid-phase dispersion medium and dispersion particles dispersed in the liquid-phase dispersion medium.

12. The display device as claimed in claim 11, wherein the dispersion particles comprise particles of scattering light or colored particles.

13. The display device as claimed in claim 11, wherein the contact particles have a polarity, and the dispersion particles are not substantially electrically charged, or the dispersion particles are electrically charged in an opposite polarity as the polarity of the contact particles.

14. A method of manufacturing a display device, comprising:

a microcapsule-containing layer formation step for forming a microcapsule-containing layer including a plurality of microcapsules each having an outer diameter and a shell having an inner portion with an inner surface, the microcapsules each produced by encapsulating a plurality of electrically charged contact particles having a hue and a polarity, and a scattering body for scattering light or a colored particles for having a different hue from the hue of the contact particles, wherein a CV value of the outer diameters of the microcapsules is 20% or less; and an electrode formation step for forming a pair of electrodes that when an electrical voltage is applied to between the pair of electrodes, electrical fields to act on the contact particles are generated, wherein the microcapsule-containing layer formation step comprises a charging step for providing net charges, of which polarity is the same as the polarity of the contact particles, to the inside of the shell after forming the inner portion or the entirety of the shell, so that the contact particles are in contact with the inner surface of the shell.

15. The method as claimed in claim 14, wherein the shell comprises a first layer corresponding to the inner portion and a second layer arranged outside the first layer, and each of the first layer and the second layer has a shell-like shape, and the charging step is performed when forming the second layer.

16. The method as claimed in claim 14, wherein each of the microcapsules has an outer surface opposite to the side of the inner portion with the inner surface, wherein in the microcapsule-containing layer formation step, the microcapsule-containing layer is formed using a microcapsule coating material prepared by mixing the microcapsules with a fixing material that makes close contact with the outer surface of each of the microcapsules to fix the microcapsules in place, and the charging step is performed after the microcapsule-containing layer formation step.

* * * * *